| United States Patent [19] | [11] Patent Number: 6,025,946 |
|---|---|
| Miyamori et al. | [45] Date of Patent: Feb. 15, 2000 |

[54] TRANSMISSION DEVICE AND TRANSMISSION METHOD

[75] Inventors: Shinji Miyamori, Tokyo; Yasuyuki Chaki, Chiba, both of Japan

[73] Assignee: Sony Corporation, Tokyo, Japan

[21] Appl. No.: 08/920,426

[22] Filed: Aug. 29, 1997

[30] Foreign Application Priority Data

Aug. 30, 1996 [JP] Japan ................................ P08-229805

[51] Int. Cl.$^7$ .................................................. H04B 10/00
[52] U.S. Cl. ..................... 359/154; 359/172; 359/183; 359/189; 375/279; 375/282; 381/77
[58] Field of Search ..................... 359/115, 149, 359/154, 172, 175–176, 180, 183, 189; 381/77; 375/282, 279; 369/59; 704/206

[56] References Cited

U.S. PATENT DOCUMENTS

| 4,163,123 | 7/1979 | Brodsky et al. ........................ 359/172 |
|---|---|---|
| 5,355,133 | 10/1994 | Shimpuku et al. ...................... 341/58 |
| 5,400,023 | 3/1995 | Ino et al. ............................... 341/59 |
| 5,432,799 | 7/1995 | Shimpuku et al. ................... 371/371.1 |
| 5,506,907 | 4/1996 | Ueno et al. ............................. 381/18 |
| 5,537,422 | 7/1996 | Shimpuku et al. ....................... 371/42 |
| 5,602,669 | 2/1997 | Chaki .................................... 359/181 |
| 5,646,966 | 7/1997 | Chaki et al. ............................ 375/368 |
| 5,737,720 | 4/1998 | Miyamori et al. ....................... 704/229 |
| 5,745,582 | 4/1998 | Shimpuku et al. ........................ 381/77 |
| 5,757,530 | 5/1998 | Crandall, Jr. ........................... 359/149 |
| 5,825,320 | 10/1998 | Miyamori et al. ....................... 341/139 |
| 5,859,826 | 1/1999 | Ueno et al. .............................. 369/59 |
| 5,870,703 | 2/1999 | Oikawa et al. .......................... 704/206 |

*Primary Examiner*—Kinfe-Michael Negash
*Attorney, Agent, or Firm*—Limbach & Limbach, LLP; Seong-Kun Oh

[57] ABSTRACT

The present invention relates to a transmission device and a transmission method which can efficiently perform transmission of audio signals with infrared ray and suppress the complication of data processing in modulation and demodulation processes to the minimum level. Audio signals reproduced by a digital audio instrument are transmitted to and recorded into a digital audio recorder through an audio signal transmission device by infrared ray. In the digital audio recorder, the recorded audio signals are immediately reproduced, transmitted and output to a digital audio instrument through an audio transmission device with infrared ray. In the transmitters, a transmission channel clock having the frequency of $5/4$-times the data clock thereof from the audio signals, and modulated signals obtained by modulating the audio signals are output at the timing of the transmission channel clock.

49 Claims, 22 Drawing Sheets

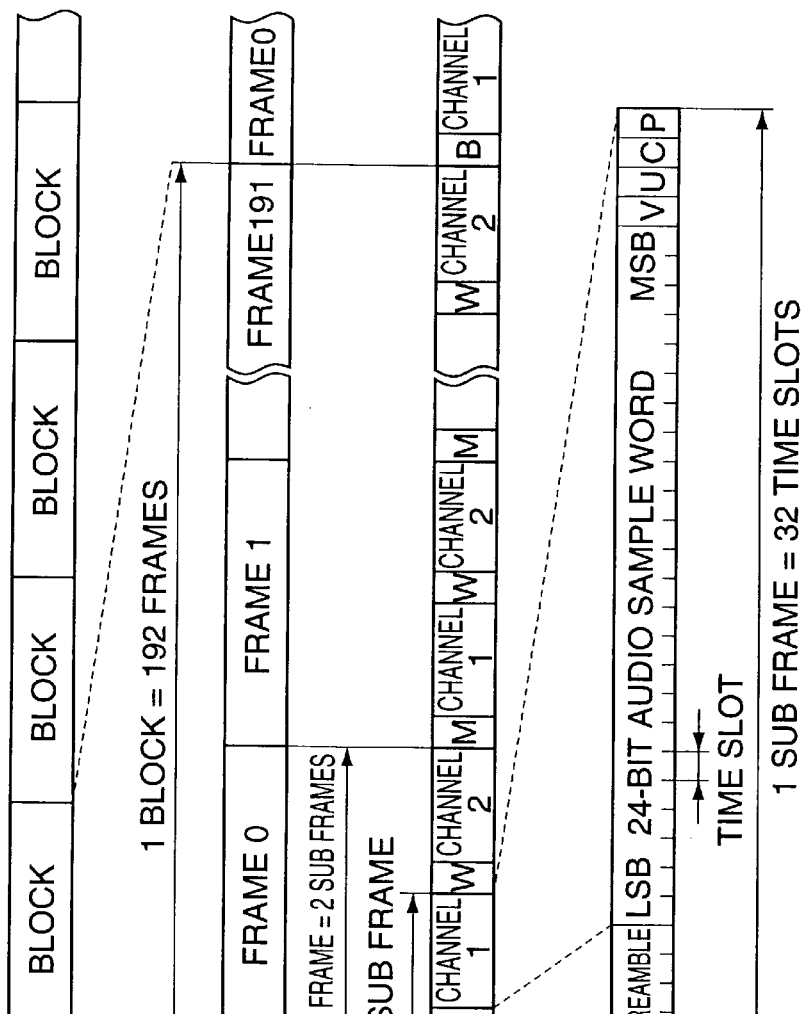

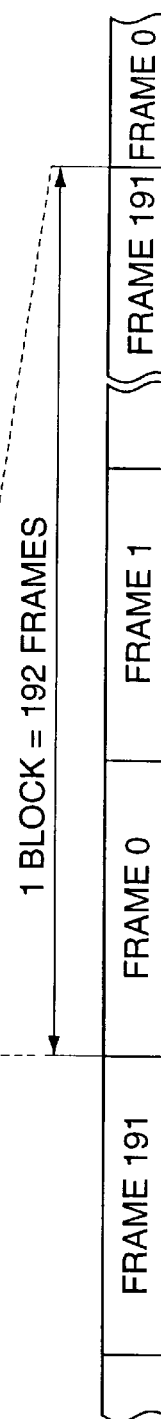
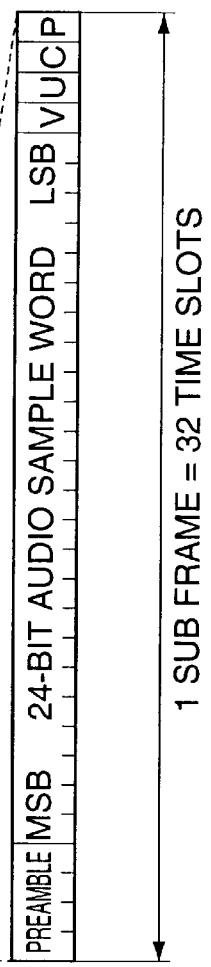
FIG. 4A
FIG. 4B
FIG. 4C
FIG. 4D

WRITE-IN BY INPUT CIRCUIT 11 · · · A, B, C, A, · · ·

PARITY ADDITION BY PARITY ADDITION CIRCUIT 14 · · · C, A, B, C, · · ·

READ-OUT BY TRANSMISSION FORMAT GENERATING CIRCUIT 15 · · · B, C, A, B, · · ·

TRANSMISSION DEVICE AND TRANSMISSION METHOD

BACKGROUND OF THE INVENTION

The present invention relates to a transmission device and a transmission method, and particularly to a transmission device and a transmission method which are suitably used to transmit digital audio signals reproduced, for example, by a digital audio instrument to a speaker, a headphone, a recording instrument, etc., with infrared ray.

When audio signals reproduced by an audio instrument -such as a CD (compact disc) reproducing device or the like are transmitted to another audio instrument such as a speaker, a headphone or the like, it is generally required to connect these instruments through a physical transmission line such as an audio cable or the like. However, with respect to the speaker, etc., sufficient stereophonic effect cannot be obtained unless the speaker is disposed far away from the audio instrument for reproducing audio signals. Therefore, an extremely long cable is needed as the audio cable for connecting the CD reproducing device and the speaker.

In order to obtain a sufficient stereophonic effect, the setup position of the speak is an important factor. However, when an audio cable is used, the setup position is restricted by the length of the audio cable.

Further, when a headphone is used through an audio cable, a user's action is restricted by the audio cable.

Therefore, there has been recently used an audio signal transmission device for transmitting audio signals reproduced by an audio instrument such as a CD reproducing device to another audio instrument such as a speaker, a headphone or the like with infrared ray. In this audio signal transmission device, audio signals to be transmitted are subjected to frequency modulation at a CD reproducing device side, and a light emitter such as a infrared ray emitter is driven on the basis of the modulation signals thus obtained, whereby the infrared ray corresponding to the modulation signals is emitted. The infrared ray propagates in the air, and is received by an infrared ray detector at the reception side such as the speaker or the headphone, for example. At the reception side, the received infrared ray is converted to the reception signals corresponding to the modulation signals, and further the reception signals are demodulated to reproduce the original audio signals.

Thus, according to the above-described audio signal transmission device, the audio signals can be transmitted collectively to many audio instruments with no physical transmission line.

However, in such an audio signal transmission device as described above, the audio signals are subjected to analog modulation such as frequency modulation or the like, and thus when the distance between audio instruments between the audio signals are transmitted is long, there is a problem that the S/N of the audio signals at the reception side is greatly deteriorated.

Therefore, in order to enhance sound quality, there has been recently proposed a digital system for digitally modulating the digital audio signals and then transmitting the signals.

When such a digital system is used, from the viewpoint of the transmission efficiency, it is ideal that the ratio of the data rate of the digital audio signals and the transmission rate thereof be equal to 1. However, for the transmission of the digital audio signals, as it is necessary to transmit an error correcting code and other necessary data, and actually, the transmission rate is higher than the data rate.

Accordingly, in order to enhance the transmission efficiency, it is best to approach the ratio of the transmission rate and the data rate to 1, however, when the ratio is complicated, the data processing in the modulation and demodulation processes is complicated.

Therefore, the transmission rate must be determined while the enhancement of the transmission efficiency and the complication of the data processing are balanced with each other.

Further, the frequency band which can be used to transmit audio signals with infrared ray is provided in the standard CP-1205 of EIAJ (Electronic Industries Association of Japan) and IEC (International Electrotechnical Commission) 1603, and the transmission rate must be determined so that the transmission band used for the transmission does not exceed the frequency band as described above.

Moreover, it is necessary to provide a transmission system for audio signals with infrared ray, which meets users' needs.

SUMMARY OF THE INVENTION

The present invention has been implemented in view of —the foregoing situation, and has an object to provide a new transmission system based on infrared ray which can perform transmission of digital audio signals meeting the standards by using infrared ray with high efficiency and with suppressing the complication of the data processing in the modulation and demodulation processes to the minimum level.

In order to attain the above goal, according to a first aspect of the present invention, a transmission device for transmitting data, comprises conversion means for demodulating digital data which are modulated in a biphase mark system, and converting the digital data to signals of a predetermined format, modulation means for subjecting an auxiliary carrier wave to phase-shift modulation on the basis of the output signal of the conversion means and outputting a modulation signal, and means for modulating infrared ray serving as a main carrier wave on the basis of the modulation signal and outputting modulated infrared ray, wherein the modulation means has generating means for generating a transmission channel clock having a frequency which is five-fourths as high as the data clock of the digital data on the basis of the digital data, and outputs the modulation signal at the timing of the transmission channel clock.

According to a second aspect of the present invention, a reception device for receiving data includes light receiving means for receiving modulated infrared ray which is obtained by modulating infrared ray serving as a main carrier wave on the basis of a modulation signal, wherein the modulation signal is obtained by subjecting an auxiliary carrier wave to phase-shift modulation on the basis of a signal of a predetermined format and transmitted at the timing of a transmission channel clock having a frequency which is five-fourths as high as the digital data, the light receiving means outputting the reception signal corresponding to the modulation signal on the basis of the modulated infrared ray, demodulation means for demodulating the reception signal and outputting the demodulation signal, and conversion means for converting the demodulation signal to digital data which are modulated in a biphase mark system, wherein the demodulation means has data clock generating means for generating the data clock on the basis of the reception signal, and outputs the demodulation signal at the timing of the data clock.

According to a third aspect of the present invention, a transfer device comprising a transmitter and a receiver is characterized in that the transmitter comprises conversion means for demodulating digital data which are modulated in a biphase mark system and converting the digital data to a signal of a predetermined format, modulation means for subjecting an auxiliary carrier wave to phase-shift modulation on the basis of the output signal of said conversion means and outputting a modulation signal, and means for modulating infrared ray serving as a main carrier wave on the basis of the modulation signal and outputting modulated infrared ray, and the receiver comprises light receiving means for receiving the modulated infrared ray and outputting the reception signal corresponding to the modulation signal on the basis of the modulated infrared ray, demodulation means for demodulating the reception signal and outputting the demodulation signal, and conversion means for converting the demodulation signal to digital data which are modulated in a biphase mark system, wherein the modulation means has generating means for generating a transmission channel clock having a frequency which is five-fourth as high as the data clock of the digital data on the basis of the digital clock, and outputs the modulation signal at the timing of the transmission channel clock, and wherein the demodulation means has data clock generating means for generating the data clock on the basis of the reception signal and outputs the demodulation signal at the timing of the data clock.

According to a fourth aspect of the present invention, a transmission method for transmitting data comprises a step of demodulating digital data which are modulated in a biphase mark system, and converting the digital data to signals of a predetermined format, a step of subjecting an auxiliary carrier wave to phase-shift modulation on the basis of the output signal of the conversion means and outputting a modulation signal, and a step of modulating infrared ray serving as a main carrier wave on the basis of the modulation signal and outputting modulated infrared ray, wherein the modulation step has a generating step for generating a transmission channel clock having a frequency which is five-fourth as high as the data clock of the digital data on the basis of the digital data, and outputs the modulation signal at the timing of the transmission channel clock.

According to a fifth aspect of the present invention, a reception method for receiving data comprises a light receiving step of receiving modulated infrared ray which is obtained by modulating infrared ray serving as a main carrier wave on the basis of a modulation signal, wherein the modulation signal is obtained by subjecting an auxiliary carrier wave to phase-shift modulation on the basis of a signal of a predetermined format and transmitted at the timing of a transmission channel clock having a frequency which is five-fourth as high as the digital data, the light receiving step outputting the reception signal corresponding to the modulation signal on the basis of the modulated infrared ray, a demodulation step of demodulating the reception signal and outputting the demodulation signal, and a conversion step of converting the demodulation signal to digital data which are modulated in a biphase mark system, wherein the demodulation step has data clock generating means for generating the data clock on the basis of the reception signal, and outputs the demodulation signal at the timing of the data clock.

According to a sixth aspect of the present invention, a transfer method comprises a transmission step and a reception step, wherein the transmission step comprise a conversion step of demodulating digital data which are modulated in a biphase mark system and converting the digital data to a signal of a predetermined format, a modulation step of subjecting an auxiliary carrier wave to phase-shift modulation on the basis of the output signal and outputting a modulation signal, and a step of modulating infrared ray serving as a main carrier wave on the basis of the modulation signal. and outputting modulated infrared ray, and wherein the reception step comprises a light receiving step of receiving the modulated infrared ray and outputting the reception signal corresponding to the modulation signal on the basis of the modulated infrared ray, a demodulation step of demodulating the reception signal and outputting the demodulation signal, and a conversion step of converting the demodulation signal to digital data which are modulated in a biphase mark system, wherein the modulation means has a generating step for generating a transmission channel clock having a frequency which is five-fourth as high as the data clock of the digital data on the basis of the digital clock, and outputs the modulation signal at the timing of the transmission channel clock, and wherein the demodulation step has a data clock generating step of generating the data clock on the basis of the reception signal and outputs the demodulation signal at the timing of the data clock.

According to a seventh aspect of the present invention, a transmission device for transmitting data comprises multiplexing means for multiplexing digital data of plural channels and outputting a multiplexed signal, modulation means for subjecting an auxiliary carrier wave to a phase-shift modulation on the basis of the multiplexed signal from the multiplexing means and outputting a modulation signal, and means for modulating infrared ray serving as a main carrier wave on the basis of the modulation signal and outputting modulated infrared ray, wherein the modulation means has generating means for generating a transmission channel clock having a frequency which is five-fourth as high as the data clock of the digital data on the basis of the digital data, and outputs the modulation signal at the timing of the transmission channel clock.

According to an eighth aspect of the present invention, a reception device for receiving data comprises light receiving means for receiving modulated infrared ray which is obtained by modulating infrared ray serving as a main carrier wave on the basis of a modulation signal, wherein the modulation signal is obtained by subjecting phase-shift modulation to auxiliary carrier wave on the basis of the multiplexed signal which is obtained by multiplexing the digital data of the plural channels, and the light receiving means outputs the reception signal corresponding to the modulation signal on the basis of the modulated infrared ray, demodulation means for demodulating the reception signal and outputting a demodulation signal, and extraction means for extracting the digital data of a predetermined channel from the demodulation signal, wherein the demodulation means has data clock generating means for generating the data clock on the basis of the reception signal, and outputs the demodulation signal at the timing of the data clock.

According to a ninth aspect of the present invention, a transfer device comprising a transmitter and a receiver is characterized in that the transmitter comprises multiplexing means for multiplexing digital data of plural channels and outputting a multiplexed signal, modulation means for subjecting an auxiliary carrier wave to phase-shift modulation on the basis of the multiplexed signal from the multiplexing means and outputting a modulation signal, and means for modulating infrared ray serving as a main carrier wave on the basis of the modulation signal and outputting a modulated infrared ray, and that the receiver comprises light receiving means for receiving the modulated infrared ray and outputting a demodulation signal, and extraction means for extracting digital data of a predetermined channel from the demodulation signal, wherein the modulation means has generating means for generating a transmission channel clock having a frequency which is five-fourth as high as the data clock of the digital data on the basis of the digital data, and outputs the modulation signal at the timing of the transmission channel clock, and wherein the demodulating means has data clock generating means for generating the data clock on the basis of the reception signal and outputs the demodulation signal at the timing of the data clock.

According to a tenth aspect of the present invention, a transmission method for transmitting data comprises a multiplexing step of multiplexing digital data of plural channels and outputting a multiplexed signal, a modulation step of subjecting an auxiliary carrier wave to a phase-shift modulation on the basis of the multiplexed signal and outputting a modulation signal, and a step of modulating infrared ray serving as a main carrier wave on the basis of the modulation signal and outputting modulated infrared ray, wherein the modulation step has a generating step of generating a transmission channel clock having a frequency which is five-fourth as high as the data clock of the digital data on the basis of the digital data, and outputs the modulation signal at the timing of the transmission channel clock.

According to an eleventh aspect of the present invention, a reception method for receiving data comprises a light receiving step for receiving modulated infrared ray which is obtained by modulating infrared ray serving as a main carrier wave on the basis of a modulation signal, wherein the modulation signal is obtained by subjecting phase-shift modulation to auxiliary carrier wave on the basis of the multiplexed signal which is obtained by multiplexing the digital data of the plural channels, and the light receiving step outputs the reception signal corresponding to the modulation signal on the basis of the modulated infrared ray, a demodulation step for demodulating the reception signal and outputting a demodulation signal, and an extraction step for extracting the digital data of a predetermined channel from the demodulation signal, wherein the demodulation step has a data clock generating step of generating the data clock on the basis of the reception signal, and outputs the demodulation signal at the timing of the data clock.

According to a twelfth aspect of the present invention, a transfer method comprising a transmission step and a reception step is characterized in that the transmission step comprises a multiplexing step of multiplexing digital data of plural channels and outputting a multiplexed signal, a modulation step of subjecting an auxiliary carrier wave to phase-shift modulation on the basis of the multiplexed signal and outputting a modulation signal, and a step of modulating infrared ray serving as a main carrier wave on the basis of the modulation signal and outputting a modulated infrared ray, and that the reception step comprises a light receiving step of receiving the modulated infrared ray and outputting a demodulation signal, and an extraction step of extracting digital data of a predetermined channel from the demodulation signal, wherein the modulation step has a generating step of generating a transmission channel clock having a frequency which is five-fourths Limes as high as the data clock of the digital data on the basis of the digital data, and outputs the modulation signal at the timing of the transmission channel clock, and wherein the demodulating step has a data clock generating step of generating the data clock on the basis of the reception signal and outputs the demodulation signal at the timing of the data clock.

According to a thirteenth aspect of the present invention, a transfer device comprising plural transmitters and plural receivers is characterized that each of the plural transmitters comprises modulation means for subjecting an auxiliary carrier wave to phase-shift modulation on the basis of digital data, and outputting a modulation signal, means for modulating infrared ray serving as a main carrier wave on the basis of the modulation signal, and light receiving means for receiving the modulated infrared ray and outputting the reception signal corresponding to the modulation signal on the basis of the modulated infrared ray, and each of the plural receivers comprises demodulation means for demodulating the reception signal and outputting a demodulation signal, and conversion means for converting the demodulation signal to digital data, wherein the demodulation means has generating means for generating a transmission channel clock having a frequency which is five-fourths as high as the data clock of the digital data on the basis of the digital data, and outputs the demodulation signal at the timing of the transmission channel clock, and wherein the demodulation means has data clock generating means for generating the data clock on the basis of the reception signal and outputs the demodulation signal at the timing of the data clock.

According to a fourteenth aspect of the present invention, a relay device for receiving a first output signal from a transmission device and transmitting a second output signal to a reception device comprises light receiving means for receiving first modulated infrared ray from the transmission device, wherein the first modulated infrared ray is obtained by modulating infrared ray serving as a main carrier wave on the basis of a first modulation signal, and the first modulation signal is obtained by subjecting a first auxiliary carrier wave to phase-shift modulation on the basis of a signal of a predetermined format and output at the timing of a transmission channel clock having a frequency which is five-fourths as high as the digital data, and wherein the light receiving means outputs the reception signal corresponding to the first modulation signal on the basis of the modulated infrared ray, demodulation means for demodulating the reception signal and outputting digital data, modulation means for subjecting a second auxiliary carrier wave to phase-shift modulation on the basis of the digital data from the demodulation means, and outputting a second modulation signal, and means for modulating infrared ray serving as a main carrier wave on the basis of the second modulation signal and outputting second modulated infrared ray to be transmitted to the reception device, wherein the demodulation means has data clock generating means for generating data clock on the basis of the reception signal, and outputs the demodulation signal at the timing of the data clock, and wherein the modulation means has generating means for generating a transmission channel clock having a frequency which is five-fourths as high as the data clock on the basis of the digital data, and outputs the digital data at the timing of the transmission channel clock.

According to a fifteenth aspect of the present invention, a relay method for receiving a first output signal from a transmission device and transmitting a second output signal to a reception device comprises a light receiving step of receiving first modulated infrared ray from the transmission device, wherein the first modulated infrared ray is obtained by modulating infrared ray serving as a main carrier wave on the basis of a first modulation signal, and the first modulation signal is obtained by subjecting a first auxiliary carrier wave to phase-shift modulation on the basis of a signal of a predetermined format and output at the timing of a transmission channel clock having a frequency which is five-fourths as high as the digital data, and wherein the light receiving step outputs the reception signal corresponding to the first modulation signal on the basis of the modulated infrared ray, a demodulation step of demodulating the reception signal and outputting digital data, a modulation step of subjecting a second auxiliary carrier wave to phase-shift modulation on the basis of the digital data, and outputting a second modulation signal, and a step of modulating infrared ray serving as a main carrier wave on the basis of the second modulation signal and outputting second modulated infrared ray to be transmitted to the reception device, wherein the demodulation step has a data clock generating step for generating data clock on the basis of the reception signal, and outputs the demodulation signal at the timing of the data clock, and wherein the modulation step has a generating step of generating a transmission channel clock having a frequency which is five-fourths as high as the data clock on the basis of the digital data, and outputs the digital data at the timing of the transmission channel clock.

According to a sixteenth aspect of the present invention, a transfer device comprising a transmitter, a relay and a receiver is characterized in that the transmitter comprises first modulation means for subjecting a first auxiliary carrier wave to phase-shift modulation on the basis of digital data, and outputting a first modulation signal, first infrared ray emitting means for modulating infrared serving as a main carrier wave on the basis of the first modulation signal and outputting first modulated infrared ray, the first modulation means having first generating means for generating a transmission channel clock having a frequency which is five-fourths times as high as the data clock of the digital data on the basis of the digital data, and outputting the modulation signal at the timing of the transmission channel clock, that the relay comprises first emitting means for receiving the first modulated infrared ray, and outputting a first reception signal corresponding to the first modulation signal on the basis of the first modulated infrared ray, first demodulation means for demodulating the first reception signal and outputting digital data, second modulation means for subjecting a second auxiliary carrier wave to phase-shift modulation on the basis of the digital data from the first demodulation means, and outputting a second modulation signal, and second infrared emitting means for modulating infrared ray serving as a main carrier wave on the basis of the second modulation signal and outputting second modulated infrared ray to be transmitted to the reception device, the first demodulation means having first data clock generating means for generating data clock, and outputting the digital data at the timing of the data clock while the second modulation means has second generating means for generating a transmission channel clock having a frequency which is five-fourths times as high as the data clock of the digital data on the basis of the digital data, and outputs the modulation signal at the timing of the transmission channel clock, and that the receiver comprises second light receiving means for receiving the second modulated infrared ray and outputting a second reception signal corresponding to the second modulation signal on the basis of the second modulated infrared ray, and second demodulation means for demodulating the second reception signal and outputting digital data, wherein the second demodulation means has second data clock generating means for generating the data clock on the basis of the second reception signal, and outputs the digital data signal at the timing of the data clock.

BRIEF DESCRIPTION OF THE DRAWINGS

FIGS. 3A to 3D show the format of DIF data input to an input interface circuit 4 of FIG. 1;

FIGS. 4A to 4D show the format of DIO data output from the input interface circuit 4 of FIG. 1;

DETAILED DESCRIPTION OF PREFERRED EMBODIMENTS

Preferred embodiments according to the present invention will be described hereunder with reference to the accompanying drawings.

Figure 1:
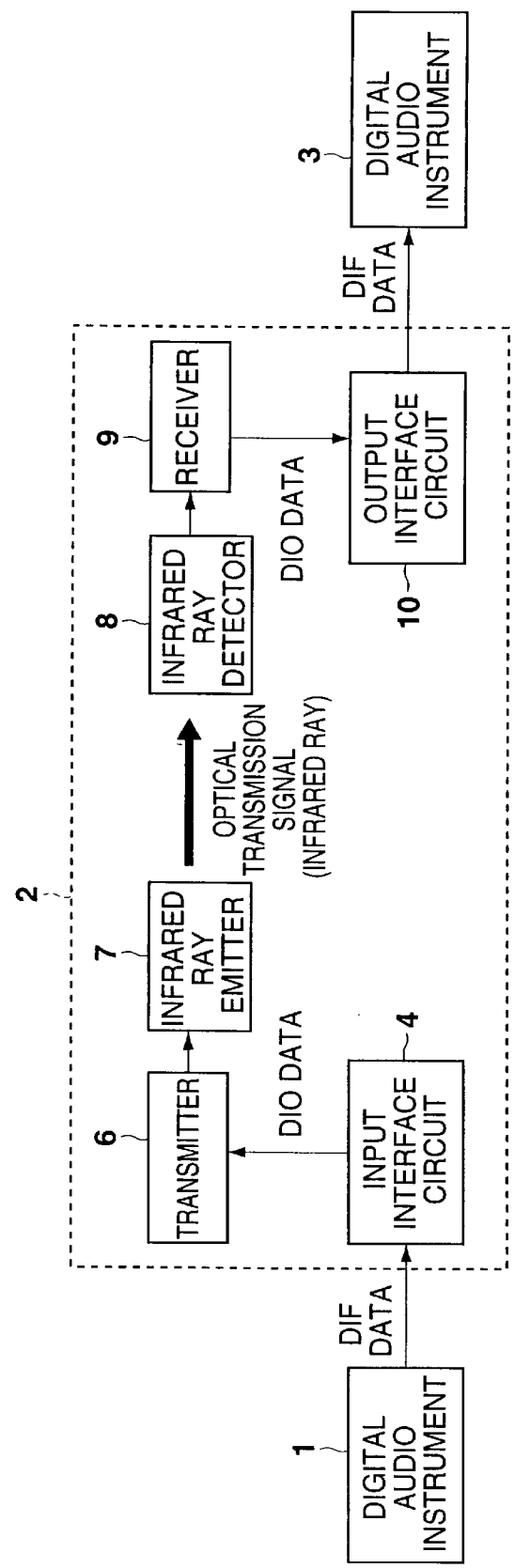
FIG. 1 is a block diagram showing the construction of a first embodiment of an audio transmission system to which the present invention is applied.

FIG. 1 shows the construction of a first embodiment of an audio transmission system to which the present invention is applied. In this audio transmission system, the digital audio signals output from a digital audio instrument 1 are transmitted to a digital audio instrument 3 through an audio signal transmission device (digital audio signal transmission device) 2.

That is, the digital audio instrument 1 comprises a CD (compact disc) reproducing device, a DAT (digital audio tape) device, an MD (Mini disc) (MD, Mini Disc is a trademark of Sony Corporation) reproducing device or the like, and it is designed to reproduce the digital audio signals and then to output the signals through a coaxial cable or an optical fiber to the audio signal transmission device 2.

Here, the analog audio signals are sampled from the digital audio instrument 1 at a sampling frequency Fs (for example, Fs=48 kHz, 44.1 kHz, 32 kHz or the like), and the sampling value is quantized with precision of 16 bits to 24 bits. Further, the quantized value is added with sub information in conformity with the IEC 958 format which is the standard defined by the IEC, and digital audio signals which are obtained by the modulation based on the biphase system, etc. are output.

The audio signal transmission device 2 comprises an input interface circuit 4, a transmitter 6, an infrared ray emitter 7, an infrared ray detector 8, a receiver 9 and an output interface circuit 10, and transmits the digital audio signal from the digital audio instrument 1 to the digital audio instrument 3.

That is, the input interface circuit 4 converts the digital audio signals (hereinafter referred to as DIF (Digital InterFace) data as necessary) from the digital audio instrument 1 to the digital audio signals (hereinafter referred to as DIO (Digital Input/Output) data as necessary) of a format which meets the processing in the transmitter 6, and outputs the signals to the transmitter 6. The transmitter 6 performs phase-deviation modulation such as QPSK modulation or the like (digital phase modulation) on a predetermined auxiliary carrier wave on the basis of the DIO data from the input interface circuit 4, and outputs to the infrared ray emitter 7 the modulation signals corresponding to the RF (Radio Frequency) signals thus obtained. The infrared ray emitter 7 is a light emitter of infrared ray which comprises an amplifier, a light emitting diode (or laser diode), a lens, an optical fiber, etc. It emits infrared ray on the basis of the modulation signals from the transmitter 6, and outputs the modulated infrared ray obtained by modulating the infrared ray serving as the main carrier wave.

The modulated infrared ray propagates in space, and is photodetected by the infrared ray detector 8. The infrared ray detector 8 is a photodetector for infrared ray which comprises an optical filter, a lens, a photodiode (or phototransistor), etc., and outputs signals (reception signals) corresponding to the detected infrared ray. Accordingly, in this case, from the infrared ray detector 8 are output the signals corresponding to the modulated infrared ray, that is, the RF signals corresponding to the modulation signals output from the transmitter 6. The RF signals are supplied to a receiver 9 to be demodulated, whereby the DIO data are reproduced. In an output interface circuit 10, the DIO data from the receiver 9 are converted to DIF data, and then output.

The DIF data which are output from the output interface circuit 10 are supplied to the digital audio instrument 3 through a coaxial cable or an optical fiber. The digital audio instrument 3 comprises a D/A converter and a speaker or a DAT device, for example, and in the instrument the digital audio signals are subjected to D/A conversion, and output from the speaker. Alternately, the digital audio signals are recorded in a recording medium such as a DAT or the like.

Figure 2:
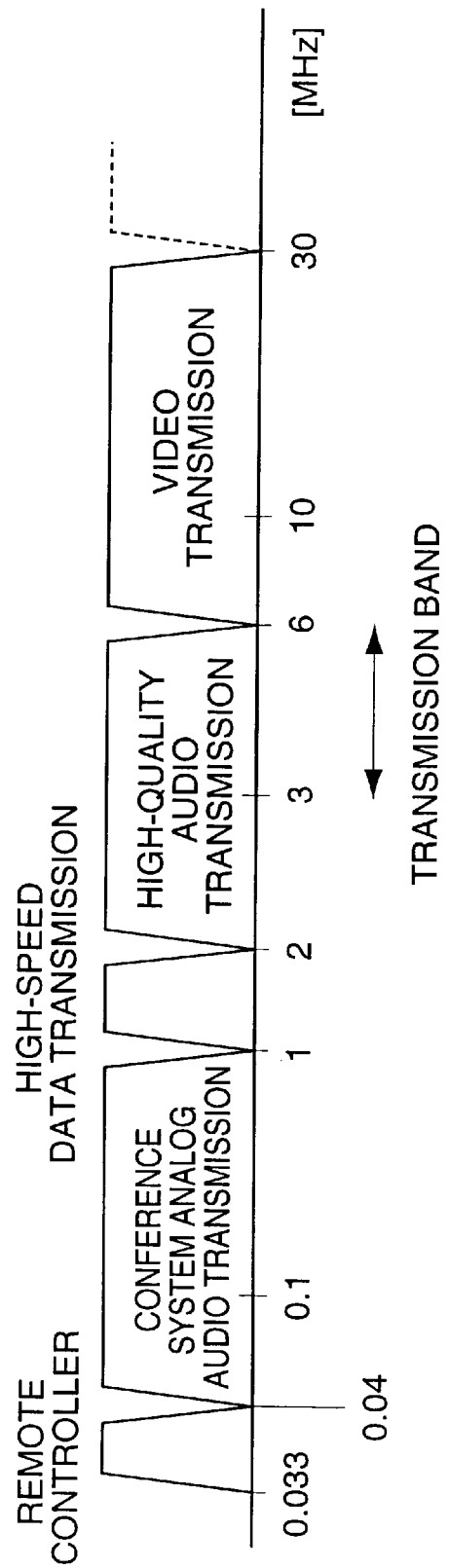
FIG. 2 is a diagram showing the frequency band which is allocated for data transmission using infrared ray according to CP-1205 of EIAJ and IEC1603.

FIG. 2 shows frequency allocation on infrared ray transmission which is defined in CP-1205 and IEC1603 of EIAJ. As shown in FIG. 2, according to CP-1205 and IEC1603, the frequency band from 2 MHz to 6 MHz is allocated for the transmission of the audio signals with infrared ray. The range of 2 MHz to 3 MHz in the frequency band is mainly used for the transmission of analog audio signals. Accordingly, according to this embodiment, in the audio signal transmission device 2, the audio signals (digital audio signals) are transmitted in the frequency band from 3 MHz to 6 MHz as a transmission band.

FIGS. 3A to 3D show an example of the format of DIF data input to the input interface circuit 4. The DIF data are composed of each block as shown in FIG. 3A. As shown in FIG. 3B, each block comprises 192 frames. Further, as shown in FIG. 3C, each frame comprises two sub frames, for example, and each sub frame comprises 32 time slots as shown in FIG. 3D. From the head of the time slots are successively disposed a preamble of 4 time slots, an audio sample word of 24 time slots, a validity flag V of 1 time slot, a user data U of 1 time slot, a channel status C of 1 time slot, and a parity bit P of 1 time slot. The time slots other than the preamble are modulated in the biphase mark system so that the data "1" has two inversions and the data "0" has one inversion.

The interval of 1 time slot corresponds to two times of the period of the data clock of the DIO data as described later with reference to FIGS. 4A to 4D.

The preamble is used for the synchronization on a sub-frame basis and on a block basis and for the discrimination thereof, and it has a special pattern out of the rule of the biphase mark system, whereby it can be easily discriminated from the other portions. Further, three kinds of patterns of B, M, W are provided to the preamble. The preamble B is disposed in the sub frame at the head of the block, the preamble M is disposed in the sub frames at the heads of the frames other than the frame at the head of the block, and the preamble W is disposed in the sub frames which are located neither at the head of the block nor at the head of the frame.

The audio sample word represents the amplitude of the audio signals which are digitized by linear quantization, and the complement of 2 corresponding to the amplitude is disposed while the LSB (least significant bit) is at the head thereof. The number of bits per word is set to 24 bits at maximum.

The validity flag V represents whether the value of each audio sample word is valid or invalid, that is, whether the audio sample word is correct.

The user data U is defined for every application, and is used to transmit the inherent information thereto. That is, for example, it is used to transmit a start ID, a shortening ID, etc. in the case of DAT.

The channel status C is used, for example, to transmit a sampling frequency, presence or absence of a pre-emphasis, copy information, etc. as information of each audio channel which can be decoded in the digital interface. The format of the information is predetermined so that the information can be decoded by any digital interface.

The parity bit P is used to detect an error and keep the polarity of the synchronous signal constant at any time.

Next, FIGS. 4A to 4D show an example of the format of the DIO data output from the input interface circuit 4 of FIG. 1.

The DIO data is constructed on a block basis as shown in FIG. 4A, and each block comprises 192 frames as shown in FIG. 4B. Each frame comprises two sub frames as shown in FIG. 4C. That is, the same construction as the DIF data are applied for the frame.

Each sub frame comprises 32 bits as shown in FIG. 4D, and from the head thereof are successively disposed a preamble of 4 bits, an audio sample word of 24 bits, a validity flag V of 1 bit, an user data U of 1 bit, a channel status C of 1 bit and a parity bit P of 1 bit.

In the case of DIO data, in the audio sample word, the data are disposed while the MSB (most significant bit) thereof, not the LSB, is disposed at the head thereof.

Here, as described above, in the input interface circuit 4, the DIF data (FIGS. 3A to 3D) are converted to the DIO data (FIGS. 4A to 4D), and the conversion processing will be described.

When receiving the DIF data from the digital audio instrument 1, the input interface circuit 4 first demodulates the DIF data which are modulated in the biphase mark system. The input interface circuit 4 alters the preamble of the demodulated DIF data to data of 4 bits. That is, the preamble in the DIF data has such a special pattern as described above, and it cannot be directly treated because it cannot be represented by 0 or 1. Therefore, in the input interface circuit 4, the special pattern as described above is converted to 4-bit data which can be represented by 0 or 1. Specifically, the preambles B, M, W are converted to 1100B, 1000B, 0100B respectively (B represents that the numeral disposed before B is binary number).

The demodulation of the biphase mark and the preamble is represented by 0 or 1 as described above, so that a bit array similar to the preamble occurs in portions other than the preamble in the DIO data.

After the conversion of the preamble, the input interface circuit 4 converts the arrangement of the data in the audio sample word from the MSB to the LSB That is, the input interface circuit 4 reads out the data of the audio sample word and writes the data into the audio sample word while setting the LSB (least significant bit) to the head.

As described above, the input interface circuit 4 demodulates the DIF data which are demodulated in the biphase mark system to convert the format thereof, thereby obtaining the DIO data, and then outputs the data to the transmitter 6.

In the output interface circuit 10 of FIG. 1, the processing (the conversion of the format and the modulation processing based on the biphase mark system) which is opposite to the above case are performed.

As is apparent from the comparison of FIGS. 3A to 3D and FIGS. 4A to 4D, the DIF data and the DIO data have remarkably similar structure. Accordingly, the conversion from the DIF data to the DIO data and the inverse conversion thereof can be realized relatively simply.

Further, in the above case, the rearrangement of the data in the audio sample word is performed. However, it is possible that the arrangement as described above is not performed. That is, in the input interface circuit 4, at least only the demodulation of the biphase mark and the conversion of the preamble may be performed (the same is applied to the output interface circuit 10).

Figure 5:
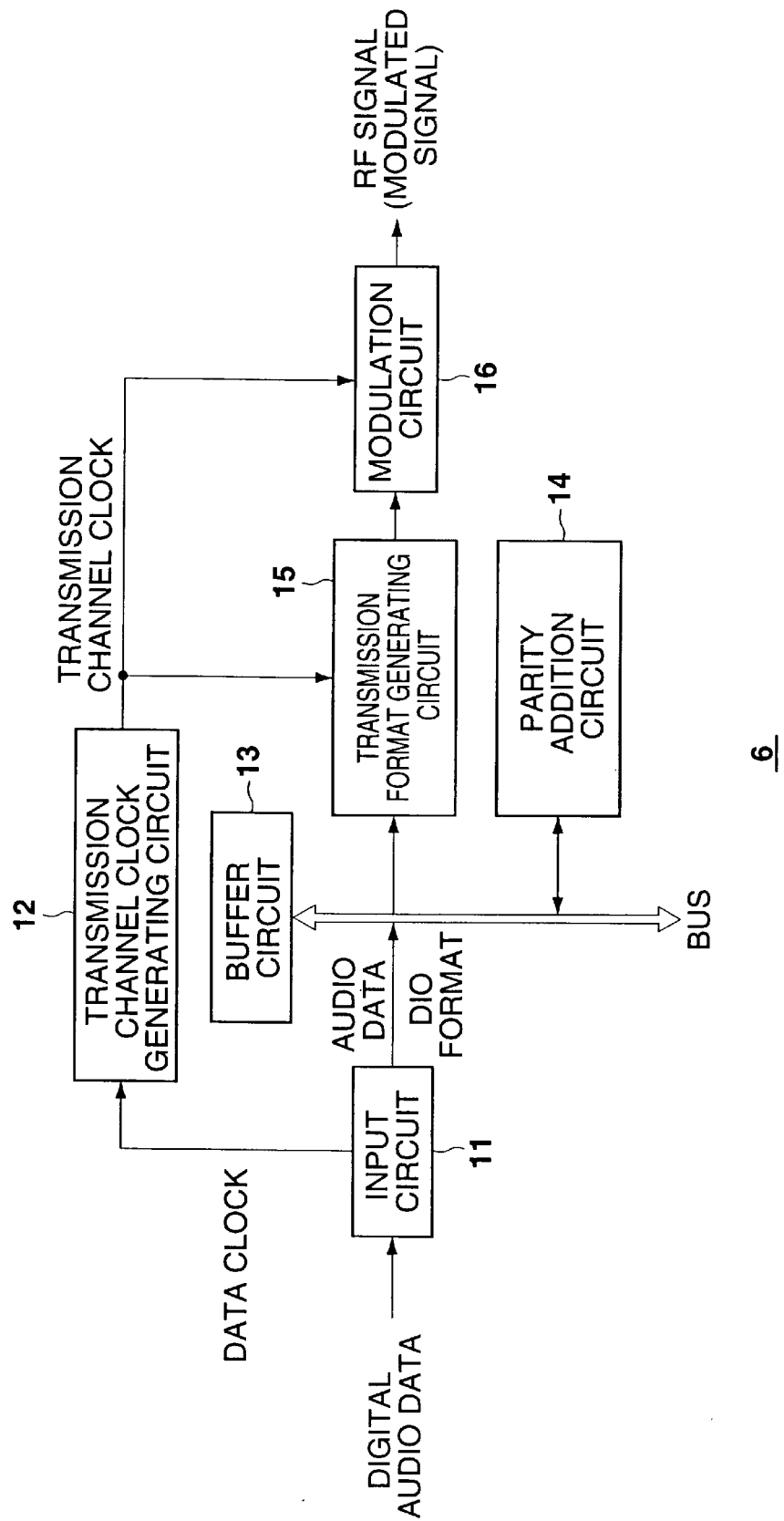
FIG. 5 is a block diagram showing the detailed construction of a transmitter 6 of FIG. 1.

Next, FIG. 5 shows the construction of the transmitter 6 of FIG. 1. The DIO data from the input interface circuit 4 are input to the input circuit 11. The input circuit 11 extracts a data clock from the DIO data, and outputs the data clock to a transmission channel clock generating circuit 12. The transmission channel clock generating circuit 12 comprises a PLL (Phase Locked Loop) circuit, a frequency dividing circuit, a frequency multiplication circuit, etc., and generates a transmission channel clock having the frequency of $5/4$-times the data clock from the input circuit 11. The transmission channel clock is supplied to a transmission format generating circuit 15 and a modulation circuit 16, and the transmission format generating circuit 15 and the modulation circuit 16 operate in accordance with the transmission channel clock.

Consequently, the modulation signals are output from the modulation circuit 16 as described later at the timing of the transmission channel clock. That is, the modulation signals are transmitted at the transmission speed corresponding to the frequency of $5/4$-times the data clock of the DIO data, and the ratio of the data rate of the DIO data and the transmission rate of the data which is transmitted from the transmitter 6 through the infrared ray emitter 7 and the infrared ray detector 8 to the receiver 9, is equal to $5/4$. In this embodiment, since QPSK modulation is performed in the modulation circuit 16, that is, the digital phase modulation is performed on symbols obtained by setting, on a 2-bit basis, data containing digital audio signals output from the transmission format generating circuit 15 as described later, so that the frequency of the transmission channel clock is $5/4$-times as high as the data clock, and also is $5/8$-times $(=5/4 \times 1/2)$ as high as the symbol clock (symbol rate).

The input circuit 11 outputs the data clock to the transmission channel clock generating circuit 12, and also outputs the DIO data through a bus to a buffer circuit 13.

Figure 6:
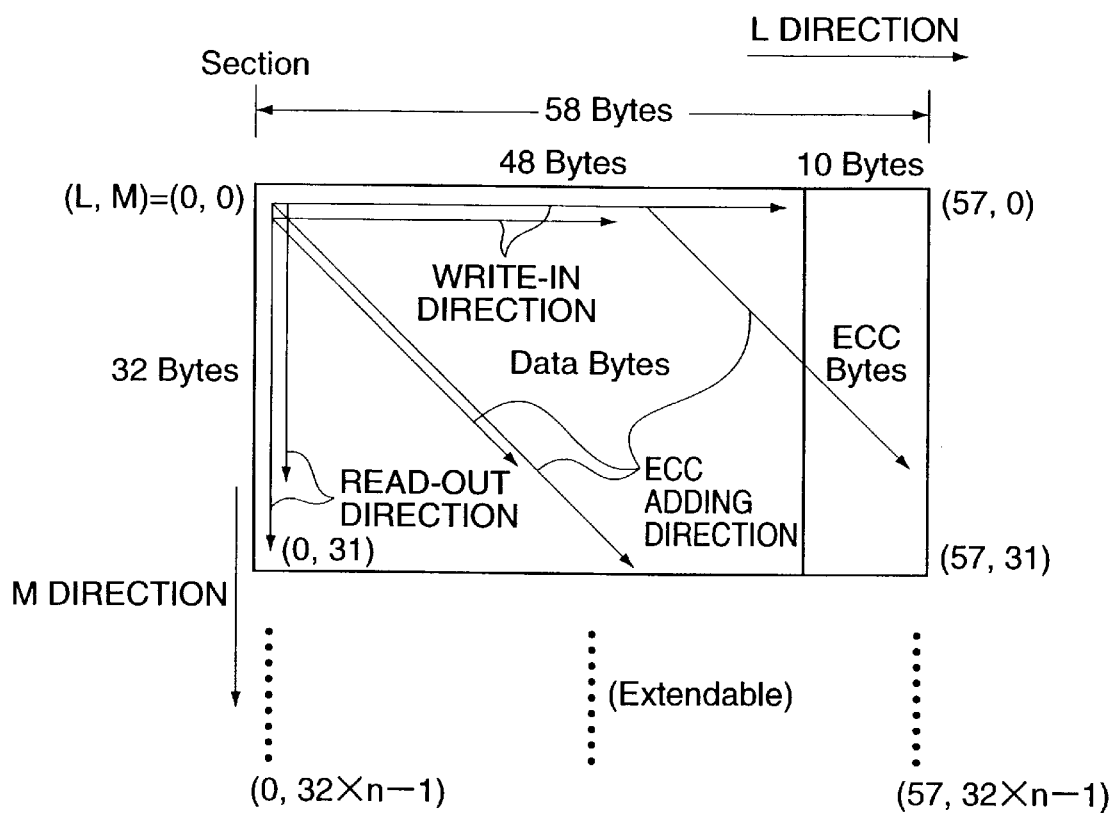
FIG. 6 is a diagram showing a write-in method and a read-out method of data to a buffer circuit 13 of FIG. 5.

The buffer circuit 13 stores the DIO data from the input circuit 11 byte by byte. That is, for example, as shown in FIG. 6, the buffer circuit 13 stores the DIO data byte by byte in an L direction (the direction from left to right), and when DIO data of 48 bytes are stored, the DIO data are stored into the just lower stage in the L direction byte by byte. When DIO data of 48 bytes are stored at that stage, the DIO data are stored into the further lower stage byte by byte, and the same processing is repeated until the DIO data of 32×n bytes are stored in the M direction (the direction from the upper side to the lower side).

That is, the address (memory address) of the buffer circuit 13 is represented by the coordinate (L,M) in the L and M directions, and it is assumed that the address at the upper leftmost side is represented by (0,0) and the L or M coordinate is increased in the left direction or in the down direction. The DIO data from the input circuit 11 are written into the buffer circuit 13 in the following order (write-in order).

---

(0,0), (1,0), (2,0), . . ., (46,0), (47,0),
(0,1), (1,1), (2,1), . . ., (46,1), (47,1),
(0,2), (1,2), (2,2), . . ., (46,2), (47,2),

. .
. .
. .

(0,31), (1,31), (2,31), . . ., (46,31), (47,31),

. .
. .
. .

(0,32n-1), (1,32n-1), (2,32n-1), . . ., (46,32n-1),
(47,32n-1)

---

As described above, the DIO data are stored in the buffer circuit 13 at every 48×32×n bytes.

Here, n represents an integer above 1, and by setting n to a predetermined value, the interleave length of the interleave which is performed by the transmission format generating circuit 15 can be adjusted. In the case where the digital audio signals are transmitted as in the case of this embodiment, n is set to 1, for example.

When the DIQ data of 48×32×n bytes are stored in the buffer circuit 13, a parity addition circuit 14 reads out the DIO data from the buffer circuit 13 through the bus to generate an error correction code (ECC) for error correction of the DIO data. The parity addition circuit 14 adds the DIO data with the error correction code, and stores the data into the buffer circuit 13 through the bus again.

That is, as shown in FIG. 6, the parity addition circuit 14 reads out DIO data of 48 bytes from the buffer circuit 13 in the lower right direction (the direction parallel to the straight line M=L), for example, and calculates the error correction code, for example, of 10 bytes, which corresponds to the DIO data. The parity addition circuit 14 writes the DIO data of 48 bytes at the original position of the buffer circuit 13, and subsequently it writes the error correction code. Thereafter, the same processing is repetitively performed on all the DIO data stored in the buffer circuit 13.

Specifically, for example, for n=1, the DIO data which are stored at the addresses (0,0), (1,1), (2,2), (31,31), (32,0), (33,1), . . . , (46,14), (47,15) are read out from the buffer circuit 13 to calculate the error correction codes of 10 bytes for the DIO data. The DIO data are stored at the same addresses as described above, and the error correction codes are stored at addresses (48,16), (49,17), (49,18), . . . , (56,25), (57,26) subsequent to the address (47,15) in the lower right direction.

Next, the DIO data stored at the addresses (0,1), (1,2), (2,3), . . . , (30,31), (31,0), (32,1), (33,2), . . . , (46,15), (47,16) are read out from the buffer circuit 13 to calculate error correction codes of 10 bytes for the DIO. The DIO data are stored at the same addresses as described above, and the error correction codes are stored at addresses (48,17), (49, 18), (49,19), . . . , (56,26), (57,27) subsequent to the address (47,16) in the lower right direction.

Thereafter, the same processing is repeated until the error correction codes for the DIO data stored at the addresses (0,31), (1,0), (2,1), . . . , (31,30), (32,31), (33,0), (34,1), . . . , (46,13), (47,14) are stored at the addresses (48,15), (49,16), (50,17), . . . , (56,24), (57,25).

For n=2, the error correction codes for the DIO data stored at the addresses (0,0), (1,1), (2,2), . . . , (46,46), (47,47) are stored at the addresses (48,48), (49,49), (50,50), . . . , (57,57) subsequent to the address (47,47) in the lower right direction, and the error correction codes for the DIO data stored at the addresses (0,1), (1,2), (2,3), . . . , (46,47), (47,48) are stored at the addresses (48,49), (49,50), (50,51), . . . , (57,58) subsequent to the address (47,48) in the lower right direction. Thereafter, the same processing repeated until the error correction codes for the DIO data stored at the addresses (0,61), (1,0), (2,1), (31,30), (32,31), . . . , (46,45), (47,46) are stored at the addresses (48,47), (49,48), (50,49), . . . , (57,56) subsequent to the address (47,46) in the lower right direction.

Accordingly, the parity additive circuit 14 adds the DIO data of 1536 (=48×32) bytes with error correction codes of 320 (=10×32) bytes at n times to structure the DIO data of 1536×n bytes and the error correction codes of 320×n bytes into one unit (generates unit data which is treated in the transmission generation circuit 15).

In this embodiment, a Reed-Solomon code which is defined on Galois group G ($2^8$) is used as an error correction code. Further, the code length of the Reed-Solomon code is set to (58,48), for example, and the code length d is set to 11, for example.

When the error correction codes as described above are added to all the DIO data stored in the buffer circuit 13, the transmission format generating circuit 15 reads out the data stored in the buffer circuit 13 from the address (0,0) in the M direction (the direction from the upper side to the lower side) as shown in FIG. 6, for example. That is, the transmission format generating circuit 15 reads the data from the buffer circuit 13 in the following order (reading order).

(0,0), (0,1), (0,2), . . ., (0,32n-2), (0,32n-1),
(1,0), (1,1), (1,2), . . ., (1,32n-2), (1,32n-1),
(2,0), (2,1), (2,2), . . ., (2,32n-1), (2,32n-1),
  .   .
  .   .
  .   .
(57,0), (57,1), (57,2), . . ., (57,32n-2), (57,32n-1)

As described above, the DIO data added with the error correction codes are read out in the reading order different from the writing order to the buffer circuit 13, and interleaved. Accordingly, in this case, the error correction capability to the burst error can be enhanced.

The transmission format generating circuit 15 adds synchronous data to perform synchronization in the receiver 9 and a header in which needed information is described are added, every the data amount of the DIO data stored in the buffer circuit 13 for n=1 and the data amount of the error correction codes, that is, every data of 1856 (=48×32+10× 32), and converts to the data of the format for transmission (hereinafter referred to as transmission data as necessary).

As described above, the data on a 1856-byte basis to which the synchronous data and the header are added is referred to as section as necessary.

Accordingly, for n=1, the section comprises the DIO data of 48×32 bytes shown in FIG. 6 and the error correction codes of 10×32 bytes.

Figure 7:
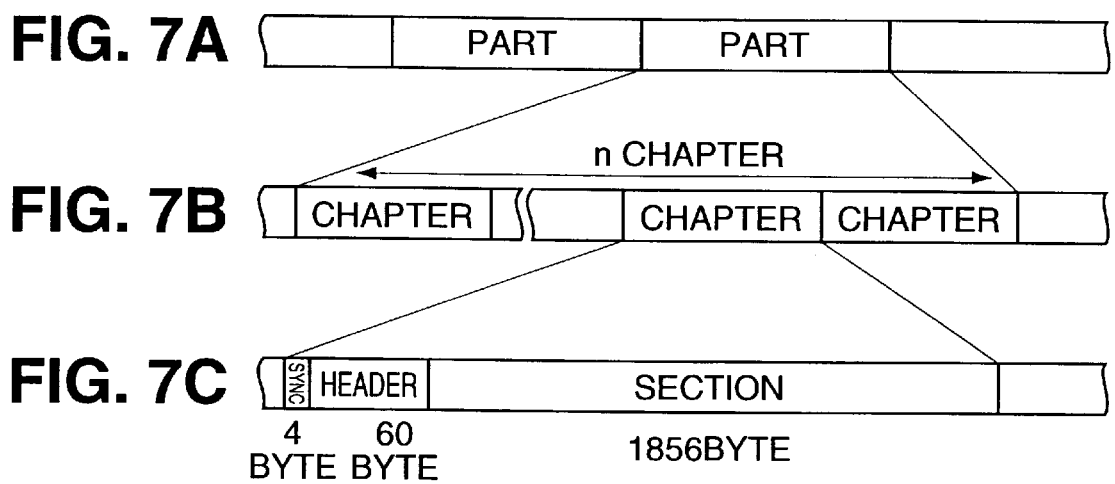
FIGS. 7A to 7C show the format of transmission data output from a transmission format generating circuit 15 of FIG. 5.

Here, FIGS. 7A to 7C show the format of the transmission data (bit stream) output from the transmission format generating circuit 15. The transmission data is constructed on a part (part) basis as shown in FIG. 7A, and each part comprises chapters (chapters) of n as shown in FIG. 7B. Each chamber comprises a sync. (sync.) of 4 bytes (=32 bits) as synchronous data, a header (header) of 60 bytes (=480 bits), and a section of 1856 bytes which are successively disposed from the head.

There are two kinds of sync., a part sync. (part sync.) and a chapter sync. (chapter sync.). The part sync. is disposed at the head chapter comprising the part, and the chapter sync. is disposed at another chapter which is not the head chapter, whereby the head of the part and the head of the chapter can be discriminated and detected. A pattern of 4 bytes in which the DC component is not concentrated when QPSK modulation is performed is used as the part sync. or chapter sync. (as the part sync. is used "01111011111111111111111111111111", for example, and as the chapter sync. is used as "11111111111111111111111111111111", for example).

Figure 8:
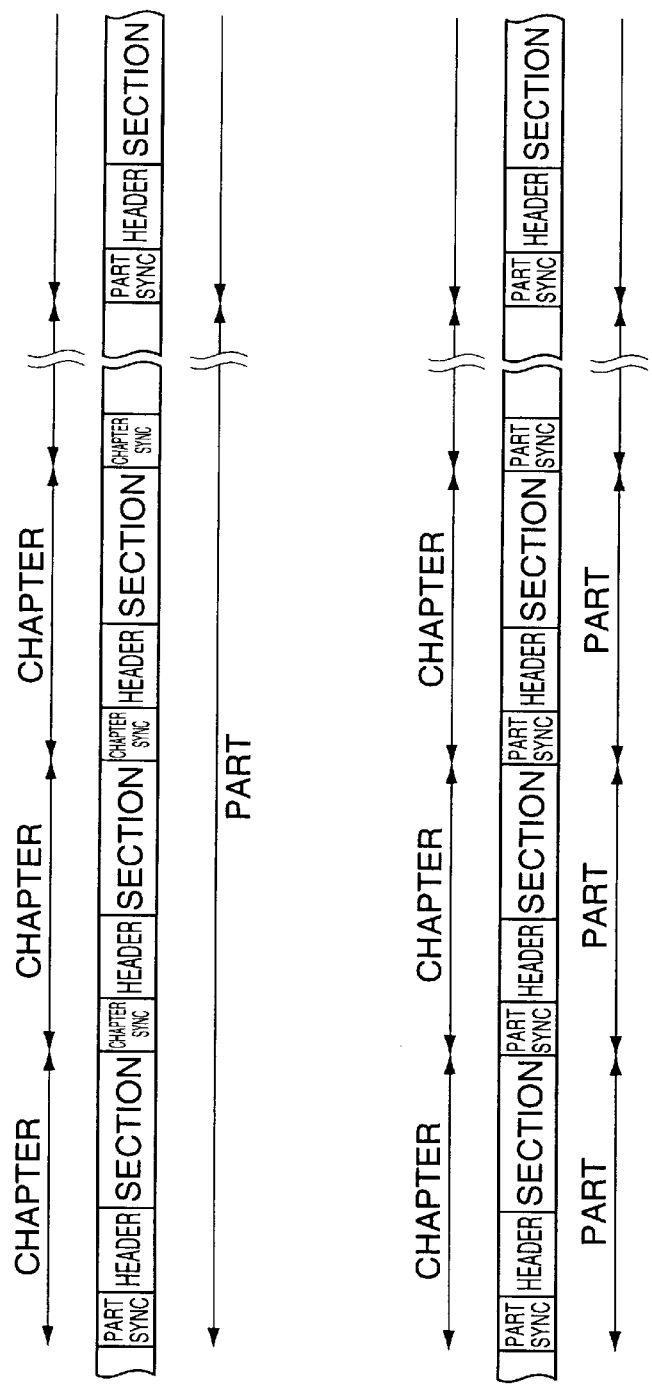
FIGS. 8A and 8B show a part sync. and a chapter sync.

Accordingly, when n is above 2, the part is constructed as shown in FIG. 8A. That is, the part sync. is disposed at the sync. of the head chapter constituting the part, and the chapter sync. is disposed at the sync. of the residual chapters constituting the part. Further, for n=1, the part is constructed as shown in FIG. 8B. That is, the part is constructed by one chapter, and the part sync. is disposed at the sync. of the chapter. The chapter sync., not the part sync., may be used for the sync. of the chapter. That is, any one of the part sync. and the chapter sync. may be used.

Figure 9:
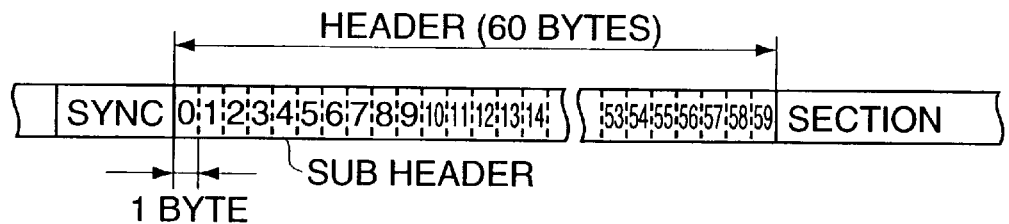
FIG. 9 is a diagram showing a header.

As shown in FIG. 9, the head comprises an array of 60 sub heads each comprising 1 byte (=8 bits), and prescribed information is described in each sub head if necessary. That is, in the header are described information which is constructed by the channel status C shown in FIG. 4D, information representing whether audio data are disposed in a section, the number n of chapters constituting a part, etc.

The transmission data of the format as described above are output from the transmission format generating circuit 15, so that the ratio of the data rate of the transmission data and the data rate of the DIO format data is equal to 5/4. That is, for example, now paying attention to the part and assuming that one part comprises chapters of n, 4×n bytes, 60×n bytes, 1536×n bytes or 320×n bytes correspond to a sync., a header, DIO data or an error correction code. Accordingly, the DIO data of 1536×n bytes are converted to the transmission data of 4×n+60×n+1536×n+320×n bytes, so that the ratio of the data rate (transmission rate) of the transmission data and the data rate of the DIO data is equal to 5/4 (=(4×n+60×n+1536×n+320×n)/(1536×n)).

As described above, the transmission format generating circuit 15 is supplied with the transmission channel clock having the frequency of 5/4-times as high as the data rate of the DIO data from the transmission channel clock generating circuit 12, and the transmission format generating circuit 15 operates in accordance with the transmission channel clock, thereby performing the processing of the transmission data.

Here, in the transmitter 6 of FIG. 5, the input circuit 11, the parity addition circuit 14 and the transmission format generating circuit 15 are connected to the buffer circuit 13 through the bus, and performs the processing by accessing the buffer circuit 13. Therefore, the access timing will be described with reference to FIG. 10.

Figure 10:
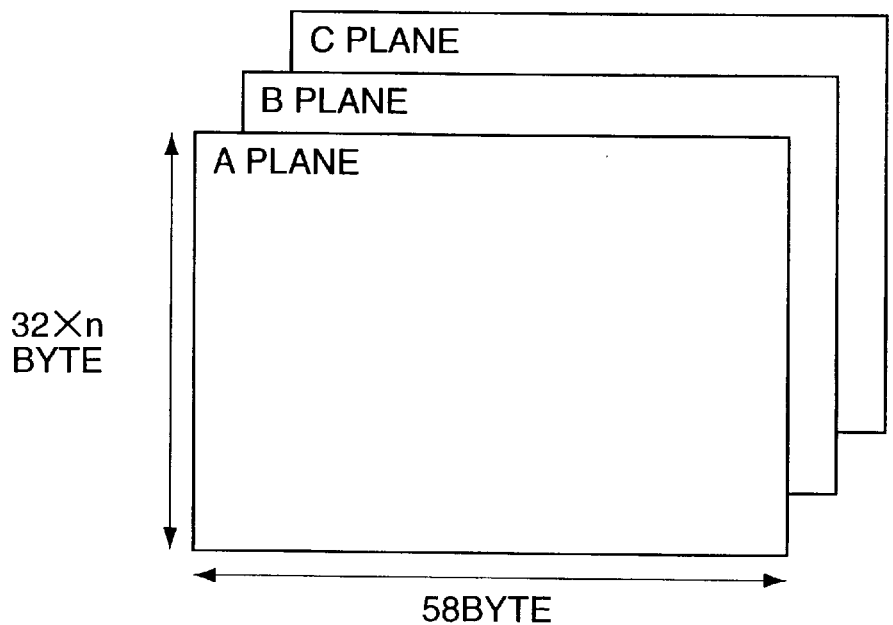
FIG. 10 is a diagram showing an access method of an input circuit 11, a parity addition circuit 14 and a transmission format generating circuit 15 to a buffer circuit 13.

FIG. 10 shows the construction of the buffer circuit 13. The buffer circuit 13 has three areas (hereinafter referred to as plane as necessary) A, B, C having a storage capacity of 58×32n bytes. The input circuit 11 successively writes the DIO data every 48×32n bytes into the planes A, B, C of the buffer circuit 13 thus constructed.

After the writing of the DIO data for every 48×32n bytes into the plane A by the input circuit 11 is completed, the parity addition circuit 14 accesses the plane A to add the error correction code to the DIO data stored therein. Further, the parity addition circuit 14 performs the same processing on the planes B and C.

After the addition of the error correction code to the DIO format data stored in the plane A by the parity addition circuit 14, the transmission format generating circuit 15 accesses the plane A to read out the stored data, and converts to the transmission data. Further, the transmission format generating circuit 15 performs the same processing on the planes B and C.

The input circuit 11 waits until the data stored in the plane A are read out to the transmission format generating circuit 15, and writes the next DIO data of 48×32n bytes into the plane A.

Subsequently, the same processing is repeated in the input circuit 11, the parity addition circuit 14 and the transmission format generating circuit 15.

Returning to FIG. 5, the transmission data output from the transmission format generating circuit 15 are supplied to the modulation circuit 16, and then subjected to the phase-deviation modulation such as the QPSK modulation therein.

Figure 11:
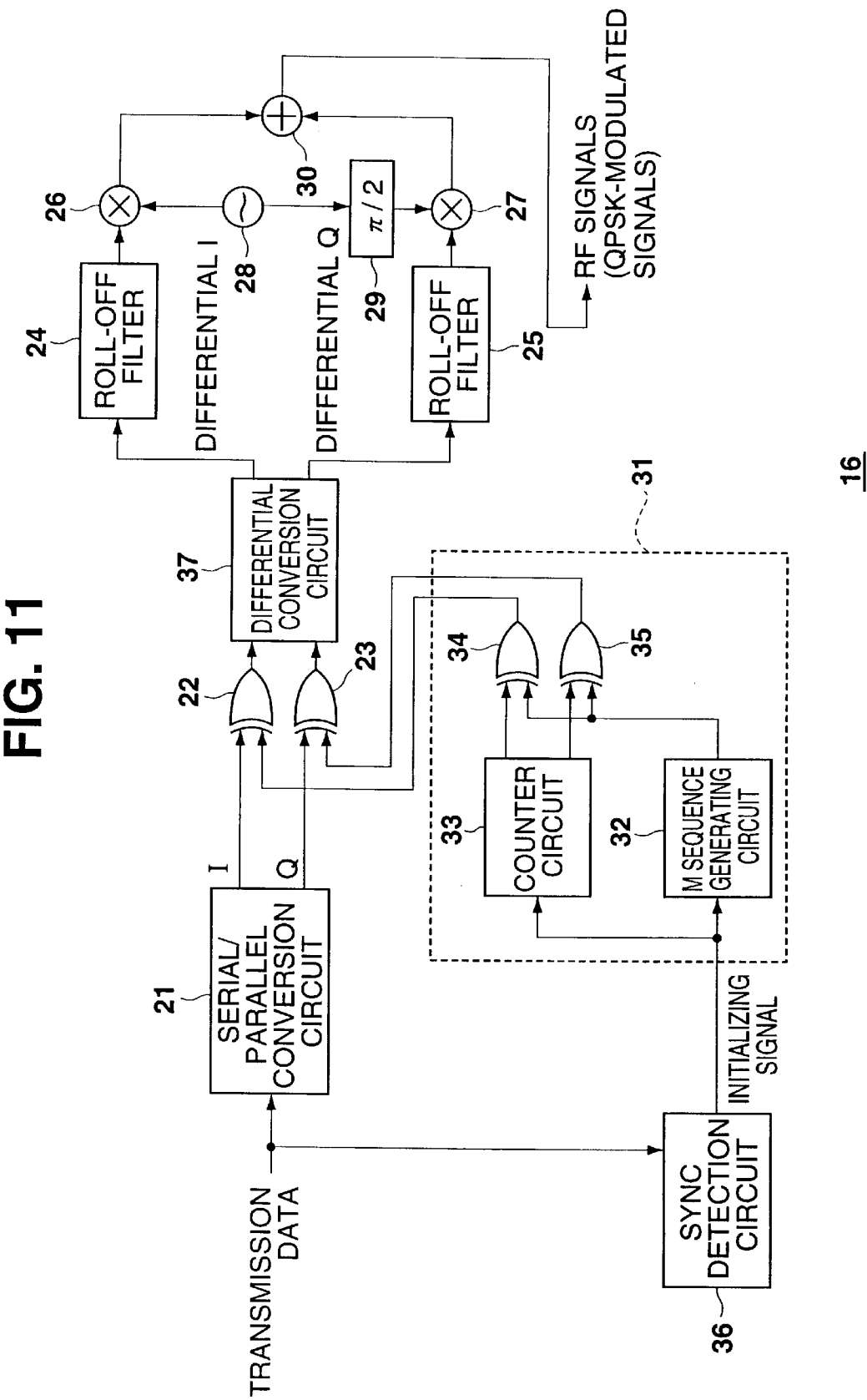
FIG. 11 is a block diagram showing the detailed construction of a modulation circuit 16 of FIG. 5.

FIG. 11 shows the construction of the modulation circuit 16. The transmission data which are serial data from the transmission format generating circuit 15 are supplied to a serial/parallel conversion circuit 21, and converted to parallel data on a 2-bit basis, that is, any one of symbols (0,0), (0,1), (1,0), (1,1). I data corresponding to the most significant bit (MSB) of the symbol or Q data corresponding to the least significant bit (LSB) are supplied to one input terminal of an EXOR gate 22 or 23.

A random code (random sequence) is supplied from a random sequence generating circuit 31 to the other input terminal of the EXOR gate 22 or 23 at the timing of the transmission channel clock. In the EXOR gate 22 or 23, the I data or Q data and the random code are subjected to exclusive OR to thereby scramble the I data and the Q data.

Here, the random sequence generating circuit 31 comprises an M sequence generating circuit 32, a counter circuit 33, and EXOR gates 34 and 35, and it generates a random code on the basis of the M sequence generated by the M sequence generating circuit 32 and the count value of the counter 33.

That is, in the M sequence generating circuit 32, an M sequence having the bit length (period) of 17 bits for example, is generated, and it is supplied to one input terminal of each of the EXOR gates 34 and 35. The counter circuit 33 comprises a counter of 2 bits, and increments its count value one by one at the timing of the transmission channel clock supplied from the transmission channel clock generating circuit 12, like 00B, 01B, 10B, 11B, 00B, 01B, . . . The most significant bit (MSB) or the least significant bit (LSB) of the count value of the counter circuit 33 is supplied to the other input terminal of the EXOR gate 34 or 35.

In the EXOR gate 34 or 35, the M sequence and the count value are subjected to exclusive OR, and supplied as random codes to the EXOR gate 22 or 23.

The M sequence generating circuit 32 and the counter circuit 33 are initialized at the timing of an initializing signal supplied from the sync. detection circuit 36 (in the M sequence generating circuit 32, an initial value for generating the M sequence is set, and in the counter circuit 33, the count value is et to 00B). The sync. detection circuit 36 detects the sync. (only the part sync. or both the part sync. and the chapter sync.), and thus the initialization of the M sequence generating circuit 32 and the counter circuit 33 is performed at the timing of the sync.

When a quash-random M sequence generated in the M sequence circuit 32 is set as a symbol, the information point on the phase plane is moved to a point-symmetrical position with respect to the origin. Further, when a periodical count value generated by the counter circuit 33 is set as a symbol, the information point on the phase plane is rotated with the origin at the center. Accordingly, when the I data and the Q data, that is, the symbol is scrambled by generating random codes from the quash-random M sequence and the periodical count value and performing the exclusive OR with the random codes, the regularity of the transmission data can be reduced. As a result, the deviation of the information point on the phase plane can be reduced.

In the EXOR gates 22 and 23, the portions other than the sync. can be scrambled. That is, in the random sequence generating circuit 31, it is judged on the basis of the initialization signal from the sync. detection circuit 36 whether the symbol supplied to the EXOR gates 22 and 23 is sync., and if it is judged to be sync., 0 is supplied the EXOR gates 22 and 23, whereby the sync. can be directly output from the EXOR gates 22 and 23.

The I or Q data which are scrambled in the EXOR gate 22 or 23 are supplied to a differential conversion circuit 37. In the differential conversion circuit 37, the I and Q data are differentially coded, and differential I and Q data thus obtained are output. That is, if we let a symbol which is a pair of the I and Q data be represented by (I, Q), the information point on the phase plane of the differential I and Q data which are previously obtained is rotated by 0, π/2, π or 3π/2 corresponding to the symbol (0,0), (0,1), (1,1) or (1,0), and the I or Q data corresponding to the information point after the rotation are output as the differential I or Q data.

Accordingly, the phase of the modulation signals generated by an adder 30 as described later is rotated by 0, π/2, π or 3π/2 when the symbol is (0,0), (0,1), (1,1) or (1,0). When such modulation signals are demodulated, it is sufficient to know the variation in phase of the modulation signals, and it is unnecessary to detect the phase of auxiliary carrier wave generated by an oscillator 28 as described later, so that the occurrence of so-called phase-uncertainty can be prevented.

The differential I or Q data output from the differential converter 37 are supplied to a roll-off filter 24 or 25. The roll-off filter 24 or 25 is constructed by a low-pass filter or the like, and it filters the differential I or Q data and outputs the data to a multiplier 26 or 27.

The multiplier 26 is supplied with not only the differential I data, but also auxiliary carrier wave from the oscillator 28. Here, the oscillator 28 generates since wave of 4.5 MHz in frequency, and supplies this wave as auxiliary carrier wave to the multiplier 26 and a phase shifter 29. The frequency of the auxiliary carrier wave is set to 4.5 MHz for the following reason. That is, as described with reference to FIG. 2, according to this embodiment, the frequency band from 3 MHz to 6 MHz is set as a transmission band and thus in order to effectively use the transmission band, the center frequency of 4.5 MHz (=(3 MHz+6 MHz)/2) is used.

The multiplier 26 multiplies the auxiliary carrier wave from the oscillator 28 and the differential I data, and outputs the result to the adder 30.

Further, a multiplier 27 is supplied with not only the differential Q data, but also the auxiliary carrier wave from the oscillator 28 through the phase shifter 29. The phase shifter 29 is designed as to output the auxiliary carrier wave from the oscillator 28 while rotating the phase of the auxiliary carrier wave by π/2. Accordingly, the multiplier 27 is supplied with the auxiliary carrier wave which is different in phase from that of the multiplier 26 by π/2. The multiplier 27 multiplies the auxiliary carrier wave and the differential Q data, and outputs the result to the adder 30. The adder 30 adds the outputs of the multipliers 26 and 27, thereby generating RF signals which are the modulated signals obtained by subjecting the QPSK modulation on the auxiliary carrier wave on the basis of the differential I and Q data.

Here, assuming that the sampling frequency is set to 48 kHz, the DIO data comprise 32 bits per sub frame, and thus the data rate thereof is equal to 3.072 Mbps (=48 kHz×32 bits×2). The data rate of the transmission data is 5/4-times as high as the data rate of the DIO data, and thus it is equal to 3.84 Mbps. With respect to the transmission data, 2 bits are treated as one symbol, so that the frequency band of the modulated signals is equal to 1.92 MHz (=3.84 MHz/2).

The foregoing is the ideal case. However, actually, the frequency band of the modulated signals is broadened by about 20 to 30% of a theoretical value. Therefore, if the frequency band of the modulated signals is broadened by 20% of the theoretical value, the value thereof is equal to 2.304 MHz (=1.92 MHz×1.2).

Accordingly, the modulated signals can be transmitted in the transmission band of 3 MHz from 3 to 6 MHz. In this embodiment, the frequency of the auxiliary carrier wave is equal to 4.5 MHz, so that there is a margin of 348 kHz (=(3 MHz−2.304 MHz)/2) at the boundary between the low area and the high area of the transmission band for the following reason. That is, even when the modulated signals as described above are transmitted with infrared ray, infrared ray other than the above infrared ray is received at the reception side. Accordingly, in order to demodulate the modulated signals, it is necessary to pick up signals in the range of 3 to 6 MHz from the signals obtained by photo-electrically converting the received infrared ray. For this operation, a band-pass filter is normally used, however, it is actually very difficult to manufacture a band pass filter which can accurately pass the signals in the range of 3 to 6 MHz. Therefore, by providing the margin at the boundary of the transmission band, the manufacturing of the band pass filter can be facilitated, and the modulated signals can be picked up.

Figure 12:
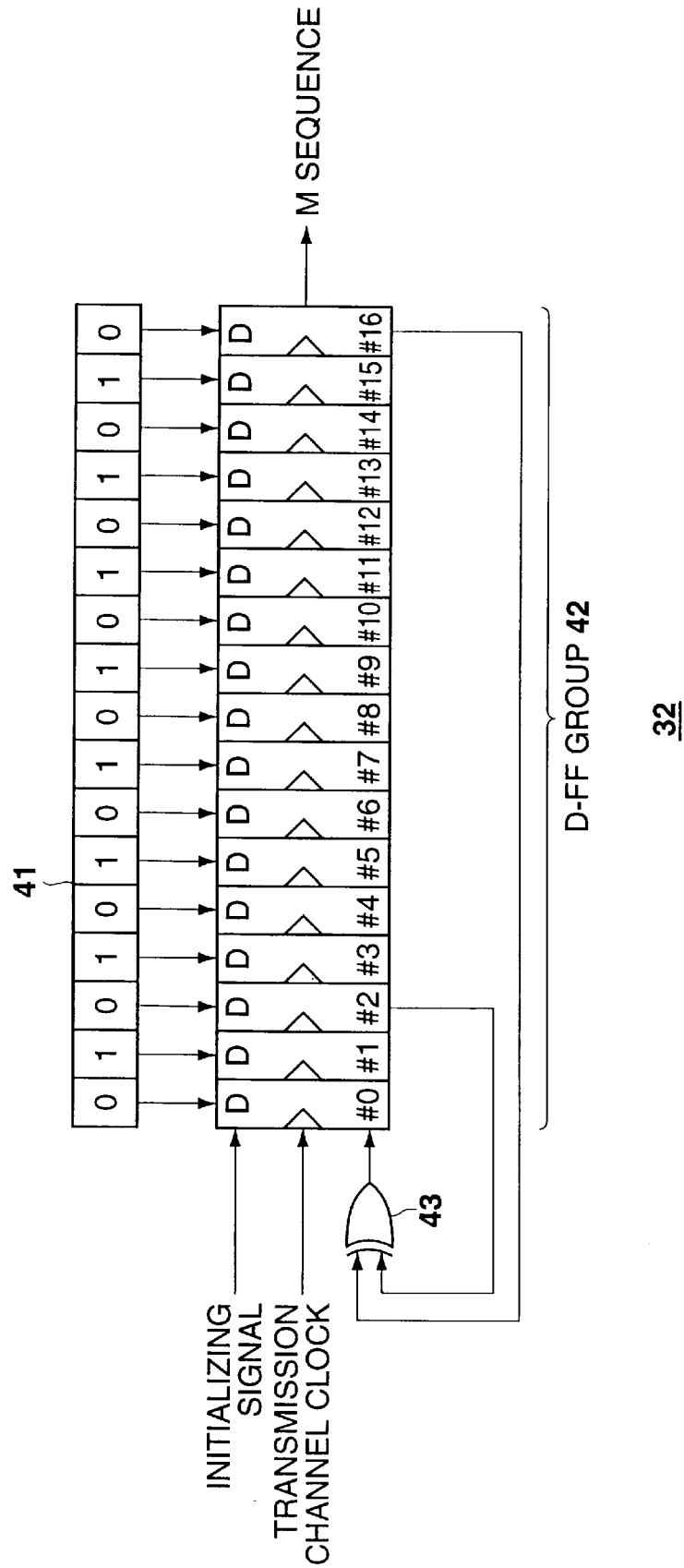
FIG. 12 is a block diagram showing the detailed construction of an M sequence generating circuit 32 of FIG. 11.

Next, FIG. 12 shows the construction of the M sequence generating circuit 32 of FIG. 11. The M sequence generating circuit 32 comprises an initial value register 41, a D-FF group 42 and an EXOR gate 43. The initial value register 41 stores an initial value for generating an M sequence. The D-FF group 42 comprises 17 D-FF (D flip flops) which are connected to one another in series. Each D-FF is supplied with a transmission channel clock as a clock, and it latches an input value at the timing of the transmission channel clock. Further, each D-FF is supplied with an initializing signal from the sync. detection circuit 36 (FIG. 11), and each D-FF latches the initial value stored in the initializing register 41 when receiving the initializing signal.

Now, the seventeen D-FFs are discriminated from one another by numbering from the leftmost one as #0, #1, #16. The input terminal of the EXOR gate 43 is supplied with the outputs of the D-FFs #2 and #16, and the output terminal thereof is connected to the input terminal of the D-FF #0.

In the M sequence generating circuit 32 thus constructed, upon supplying of the initializing signal, the D-FF group 42 latches the initial value stored in the initial value register 41. That is, in this embodiment, for example, 01010101010101010B is stored as the initial value in the initial value register 41, and 0,1,0,1,0,1,0,1,0,1,0,1,0,1,0,1, or 0 are latched in the D-FFs #0 to #16. Thereafter, in the D-FFs #1 to #16, the outputs of the D-FFs #0 to #15 at the previous stage are successively latched at the timing of the transmission channel clock. In the EXOR gate 43, the outputs of the D-FFs #2 to #16 are subjected to exclusive OR, and supplied to the D-FF #0. In the D-FF #0, the output of the EXOR gate 43 is successively latched at the timing of the transmission channel clock. As described above, a quash-random M sequence is output from the D-FF #16.

In the M sequence generating circuit 32, the above-described operation is repetitively performed until a next initializing signal is received. When receiving the -initializing signal, the initial value is latched by the D-FFs #0 to #16, and the above operation is subsequently performed.

In this embodiment, the M sequence generating circuit 32 is designed to generate the M sequence of 17-bit length. However, it may be designed to generate the M sequence having a different bit length.

That is, the bit length of the M sequence may be set so that the period thereof is longer than the length corresponding to the number of bits constituting a section. Accordingly, as shown in FIG. 7C, the section is composed of 1856 bytes. Further, when one M sequence is used for one symbol, that is, two bits in the scrambling operation, m which satisfies 1856 bytes×8 bits/2 bits/symbols<$2^m-1$ may be used as the bit length of the M sequence. Accordingly, in this case, the bit length of the M sequence may be above 13 bits.

Figure 13:
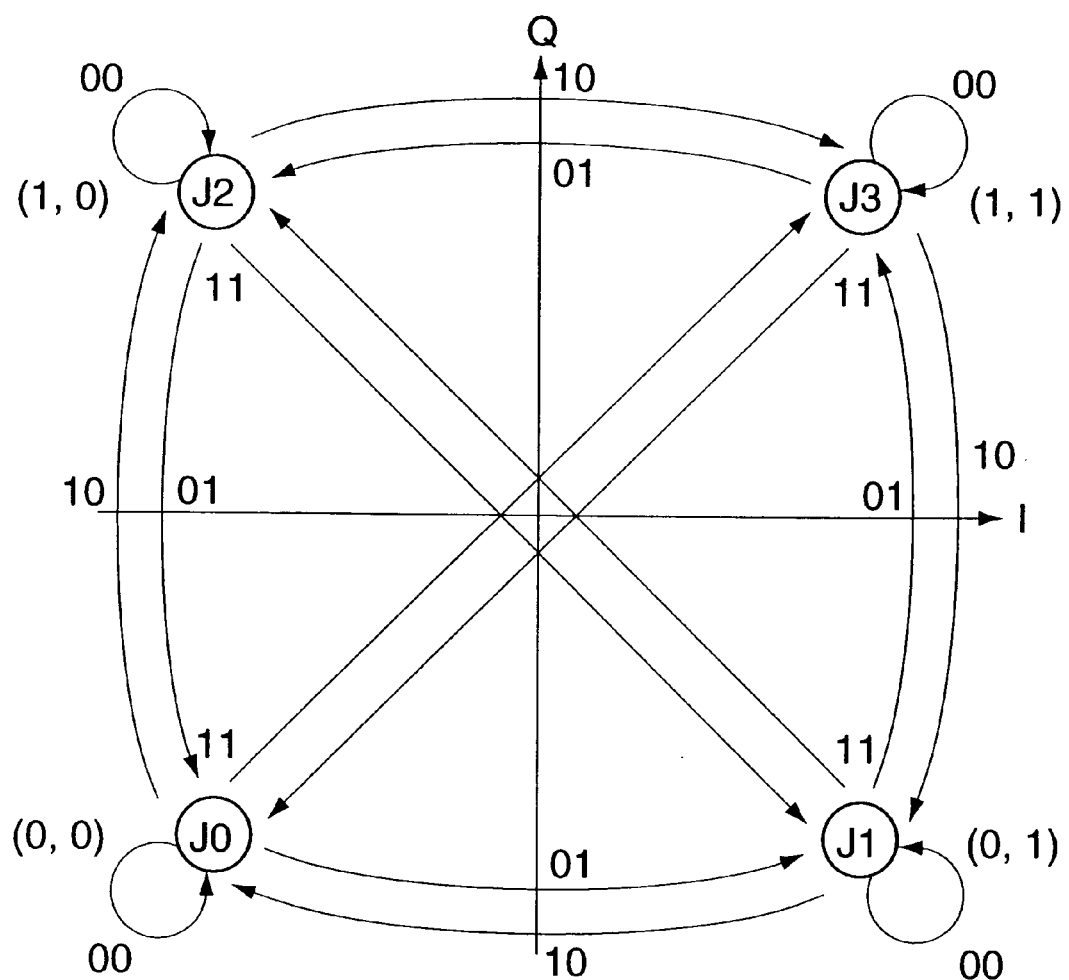
FIG. 13 is a state transition diagram showing the operation of a differential converter 37 of FIG. 11.

Next, the operation of the differential conversion circuit 37 of FIG. 11 will be further described with reference to FIG. 13. FIG. 13 shows the state transition of the differential conversion circuit 37. That is, the differential conversion circuit 37 has four states of J0, J1, J2, J3. When the I and Q data are input, it changes the state thereof in accordance with an input value, and outputs the differential I and Q data in accordance with the state after transition.

Specifically, in the embodiment shown in FIG. 13, (0,0), (0,1), (1,0) or (1,1) is allocated to the state J0, J1, J2 or J3 respectively as a pair of the differential I and Q data (differential I, differential Q). If (0,0) is input as the I and Q data when the state is the state J0, J1, J2 or J3, the state does not vary, that is, the state is transited (self-transited) to the state J0, J1, J2 or J3 respectively, so that (0,0), (0,1), (1,0) or (1,1) is output as the differential I and Q data.

If (0,1) is input as the I and Q data when the state is the state J0, J1, J2 or J3, the state is transited to the state J1, J3, J0 or J2, so that (0,1), (1,1), (0,0) or (1,0) is output as the differential I and Q data.

If (1,0) is input as the I and Q data when the state is the state J0, J1, J2 or J3, the state is transited to the state J2, J0, J3 or J1, so that (1,0), (0,0), (1,1) or (0,1) is output as the differential I and Q data.

If (1,1) is input as the I and Q data when the state is the state J0, J1, J2 or J3, the state is transited to the state J3, J2, J1 or J0, so that (1,1), (1,0), (0,1) or (0,0) is output as the differential I and Q data.

Figure 14:
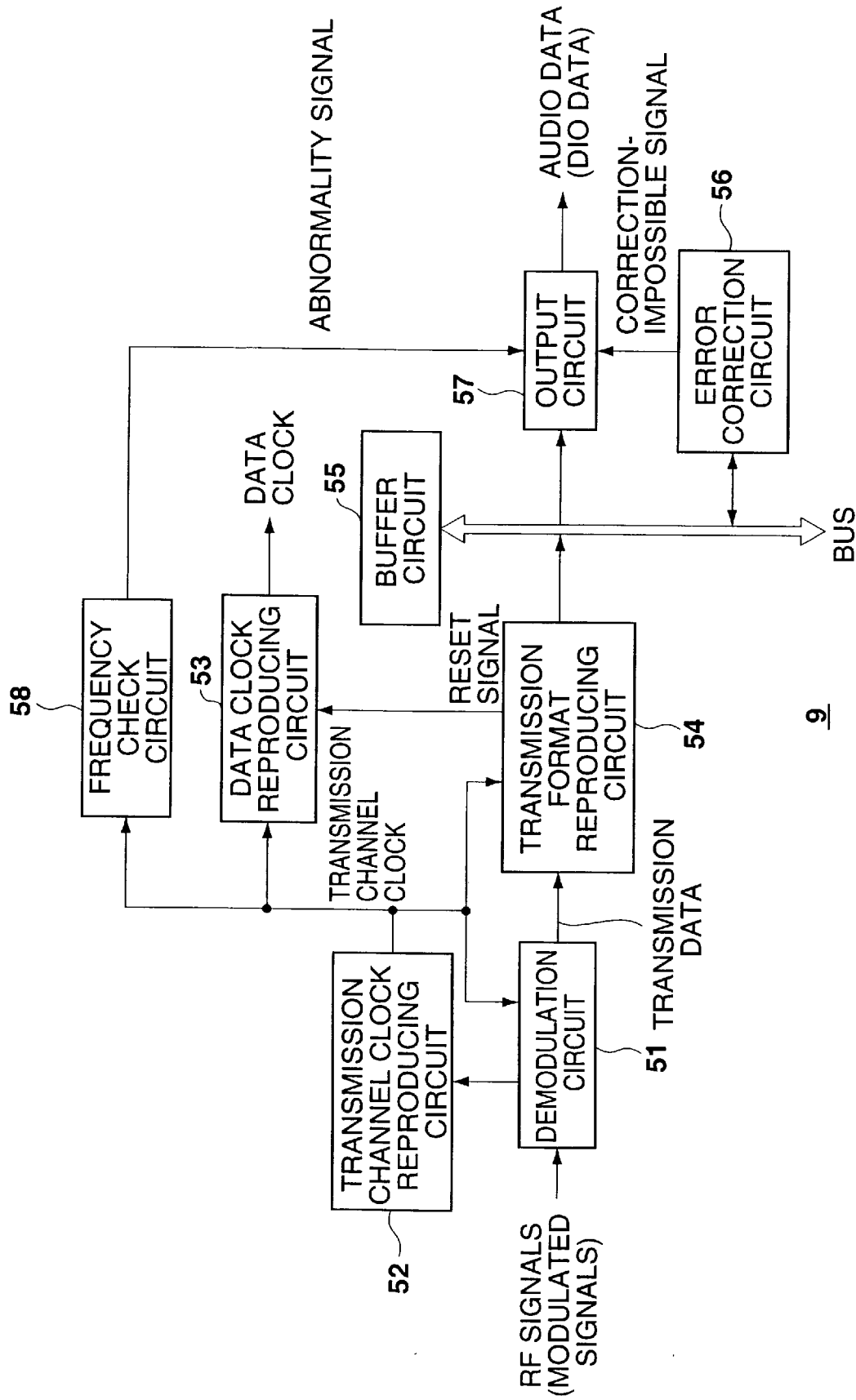
FIG. 14 is a block diagram showing the detailed construction of a receiver 9 of FIG. 1.

Next, FIG. 14 shows the construction of the receiver 9 of FIG. 1. The modulated signals as described above are supplied to the receiver 9 through the infrared ray emitter 7 and the infrared ray detector 8, and input to the demodulation circuit 51. The demodulation circuit 51 is designed to contain a carrier wave extraction circuit having a so-called Kostas loop, and it performs the QPSK demodulation on the modulated signals and further performs the scramble releasing processing and the other necessary processing, thereby reproducing the transmission data of the format as described with reference to FIGS. 7A to 7C. The transmission data are supplied to the transmission channel clock reproducing circuit 52 and the transmission format reproducing circuit 54.

The transmission channel clock reproducing circuit 52 reproduces the transmission channel clock on the basis of the transmission data from the demodulation circuit 51, and supplies it to the demodulation circuit 51, a data clock reproducing circuit 53, a transmission format reproducing circuit 54 and a frequency check circuit 58. In the demodulation circuit 51 and the transmission format reproducing circuit 54, the processing is performed in accordance with the transmission channel clock.

The transmission data output from the demodulation circuit 51 are scrambled in the modulation circuit 16 as described above, so that the degree of edge lack of the transmission data is reduced. Accordingly, in this case, there can be prevented occurrence of reproduction failure of the transmission channel clock in the transmission channel clock reproducing circuit 52.

The data clock reproducing circuit 53 comprises a PLL circuit, a frequency dividing circuit and a frequency multi-plication circuit, for example, and it reproduces a clock whose frequency is multiplied by four-fifth that is, the data clock of the audio data on the basis of the transmission channel clock. The data clock is supplied to the output circuit 57 and other necessary blocks. Accordingly, in the output circuit 57, etc., the processing is performed at the timing of the data clock.

The data clock reproducing circuit 53 is supplied with a reset signal from the transmission format reproducing circuit 54, and the data clock reproducing circuit 53 controls the lock phase of the built-in PLL circuit on the basis of the reset signal.

The transmission format reproducing circuit 54 extracts a section from the transmission data from the demodulation circuit 51, and stores the data through the bus into a buffer circuit 55 which has the same construction as the buffer circuit 13 of FIG. 5. That is, the transmission format reproducing circuit 54 writes the data constituting the section in the M direction into the buffer circuit 55, whereby the block (hereinafter referred to as deinterleave block as necessary) of the data of 58×32n bytes which comprise the DIO data and the error correction codes as described in FIG. 6 is reconstructed to thereby perform the deinterleave.

The transmission format reproducing circuit 54 extracts a header from the transmission data, and refers to the value of n described in the header to recognize the number of sections constituting the deinterleave block. However, the number of sections can be recognized by detecting the interval of part syncs, for example.

In the transmitter 6, the value of n is described in the header. However, when n is equal to 1, in place of the value of 1, 0 may be described. In this case, in the transmission format reproducing circuit 547 when n described in the header is equal to 0 or 1, the number of sections constituting the deinterleave block is recognized as 1.

The transmission format reproducing circuit 54 may be designed to refer to the information on the data described in the header (information indicating whether the audio data are disposed in the section) to recognize the type of the data stored in the section, and recognize it irrespective of the value of n described in the header that the number of sections constituting the deinterleave block is equal to 1 when the type of the data is the digital audio signal. This is because n is set to 1 when the digital audio signals are transmitted as described above.

Here, it is based on the following reason that n is set to 1 when the digital audio signals are transmitted. That is, as described above, n is to determine the interleave length, and thus as n increases, the error correction capability to the burst error is enhanced. However, a long time is needed for the interleave. Therefore, when it is considered that moving pictures and sounds appended thereto are transmitted, the reproduction of the sounds is started with a large delay from the start of the reproduction of the moving pictures if n is large. If such a delay of sounds occurs at about 100 ms or more, the delay can be sensed by human auditory sense, and it makes a human uncomfortable. Therefore, the delay time of the sounds is preferably reduced to 100 ms or less. In order to achieve this, when the section comprises data of 58×32n bytes, n must be set to 1.

The transmission format reproducing circuit 54 not only writes the deinterleave block into the buffer circuit 55 as described above, but also detects the sync. in the transmission data to output the reset signal to the data clock reproducing circuit 53 at the timing of the sync., thereby controlling the lock phase of the data clock reproducing circuit 53 as described above.

When the deinterleave block is stored in the buffer circuit 55, the error correction circuit 56 reads the deinterleave data as in the case of the parity addition circuit 14 of FIG. 5, and performs the error correction on the DIO data on the basis of the error correction code. The error correction circuit 56 writes the error-corrected DIO format data into the buffer circuit 55.

As described above, the Reed-Solomon code is used as the error correction code in this embodiment, and the error correction circuit 56 sets the distance d of the correction code to enable error detection or an error correctable range r to 11 or 4 respectively, for example, so that the error correction is performed in this range.

Further, when the error correction cannot be performed, the error correction circuit 56 outputs to the output circuit 57 a correction-impossible signal representing that the error correction cannot be performed. When receiving the correction-impossible signal from the error correction circuit 56, the output circuit 57 stops the output of the DIO data read out from the buffer circuit 55, thereby preventing the output of the DIO data on which the error correction cannot be performed.

After the write-in operation of the DIO data into the buffer circuit 55 by the error correction circuit 56 is completed, the output circuit 57 reads out the DIO data from the buffer circuit 55 and outputs the DIO data to the output interface circuit 10 of FIG. 1 in accordance with the data clock from the data clock reproducing circuit 53.

The output circuit 57 is supplied with an abnormality signal from a frequency check circuit 58, and the output circuit 57 stops the output of the DIO data not only when receiving the correction-impossible signal, but also when receiving the abnormality signal.

The frequency check circuit 58 judges whether the frequency of the transmission channel clock supplied from the transmission channel clock reproducing circuit 52 is normal, that is, whether it is equal to 3.84 MHz (=48 kHz×32 bits×2×5/4) in this embodiment. If the frequency of the transmission channel clock is not normal, it outputs the abnormality signal indicating the fact to the output circuit 57, whereby the output of the DIO data by the output circuit 57 is stopped. Accordingly, in this case, the output of the DIO data which are not normal can be also prevented.

Figure 15:
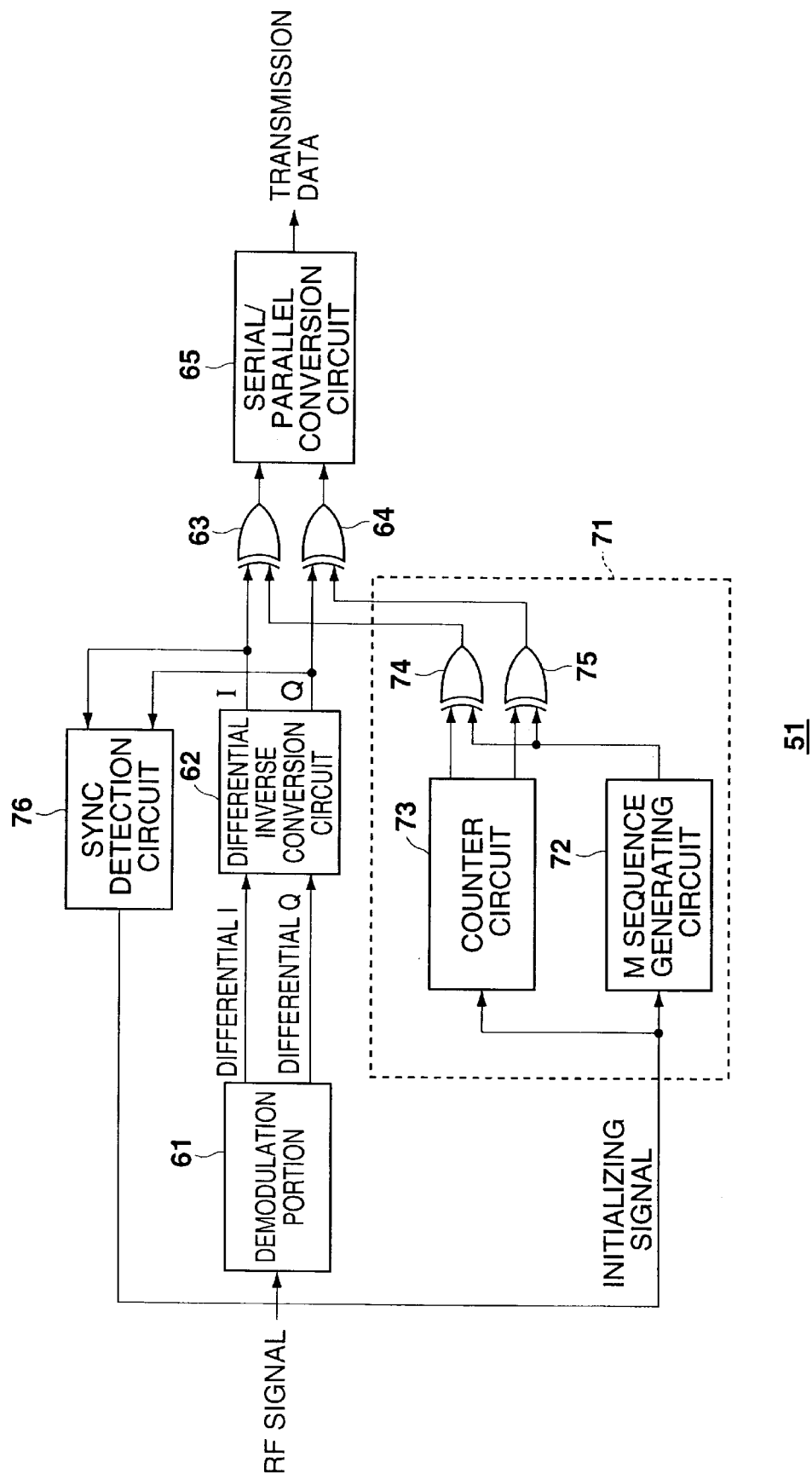
FIG. 15 is a block diagram showing the detailed construction of a demodulation circuit 51 of FIG. 14.

Next, FIG. 15 shows the construction of the demodulation circuit 51 of FIG. 14. The modulated signals (RF signals) from the infrared ray detector 8 are supplied to a demodulation portion 61. The demodulation portion 61 has a carrier wave extraction circuit having a Kostas loop, and it performs the QPSK demodulation by detecting the auxiliary carrier wave and locking the phase thereof to thereby obtain the differential I and Q data, and the differential I and Q data are output from the demodulation portion 61 to a differential inverse conversion circuit 62. In the differential inverse conversion circuit 62, the inverse processing to that of the differential conversion circuit 37 of FIG. 11 is performed to reproduce the I and Q data. That is, the differential inverse conversion circuit 62 detects the degree by which the information point PPRE on the phase plane of the previously-received differential I and Q data is rotated (counterclockwisely rotated) to obtain the information point $P_{NOW}$ on the phase plane of the just received differential I and Q data. When the information point $P_{NOW}$ is obtained by rotating the information point $P_{PRE}$ by 0, π/2, π, or 3π/2, the differential inverse conversion circuit 62 outputs (0,0), (0,1), (1,1) or (1,0) respectively as a pair of (I,Q) of the I and Q data.

Accordingly, in the demodulation portion 61, even when the auxiliary carrier wave is not accurately phase-locked, the accurate I and Q data can be obtained from the phase difference between the information points $P_{NOW}$ and $P_{PRE}$.

The I and Q data are supplied to one input terminals of EXOR gates 63 and 64 respectively. The other input terminals of the EXOR gates 63 and 64 are supplied with a random code from a random sequence generating circuit 71, and the exclusive OR between the I or Q data and the random sequence is calculated in the EXOR gates 63 or 64 respectively.

Here, the random sequence generating circuit 71 comprises an M sequence generating circuit 72, a counter circuit 73, and an EXOR gate 74 or 75 which are constructed in the same structure as the M sequence generating circuit 32 of FIG. 11, the counter circuit 33, and the EXOR gate 34 or 35. The M sequence generating circuit 72 and the counter circuit 73 are supplied with the initializing signal from the sync. detection circuit 76. The sync. detection circuit 76 is supplied with the I and Q data, and in the sync. detection circuit 76, sync. is detected from the I and Q data (since the sync. is not scrambled as described above, it can be detected even when it is before the descramble) and the initializing signal is output at the timing thereof. Accordingly, the M sequence generating circuit 72 and the counter circuit 73 are initialized at the same timing as the M sequence generating circuit 32 and the counter circuit 3 of FIG. 11. The random code generated by the random sequence generating circuit 71 is the same as generated by the random sequence generating circuit 31 of FIG. 11.

As a result, in the EXOR gate 63 or 64, the I and Q data can be descrambled by calculating the exclusive OR between the random code as described above and the I or Q data.

The descrambled I and Q data, that is, 2-bit parallel data are supplied to a parallel/serial conversion circuit 65 to be converted to serial data, that is, transmission data.

Figure 16:
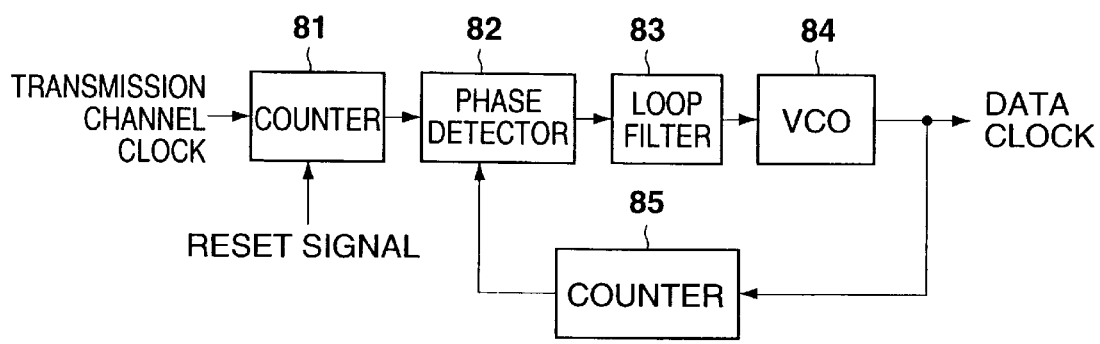
FIG. 16 is a block diagram showing the detailed description of a PLL circuit contained in a data clock reproducing circuit 53 of FIG. 14.

Next, the FIG. 16 shows the construction of a PLL circuit which is contained in the data clock reproducing circuit 53 of FIG. 14. The transmission channel clock from the transmission channel clock reproducing circuit 52 is supplied to a counter (or prescaler) 81. The counter 81 counts the transmission channel clock, and outputs a pulse when the count value reaches a predetermined value. At this time, the counter 81 resets the count value to zero, and starts its count of the transmission channel clock again. The counter 81 repeats the same operation to divide the frequency of the transmission channel clock. Here, the pulse output from the counter 81 is hereinafter referred to as a frequency-divided transmission channel clock as necessary.

The counter 81 is supplied with a reset signal from the transmission format reproducing circuit 54, and the counter 81 also resets the count value when receiving this reset signal.

The frequency-divided transmission channel clock output from the counter 81 is supplied to a phase detector 82. The phase detector 82 is supplied with not only the frequency-divided transmission channel clock, but also the output of a counter 85. In the phase detector 82, the output of the counter 85 and the frequency-divided transmission channel clock are compared in phase, and the voltage corresponding to the phase difference (hereinafter referred to as phase difference voltage as necessary) is output to a loop filter 83.

The loop filter 83 eliminates high frequency components from the phase difference voltage supplied from the phase detector 82 to obtain a prescribed loop gain, and outputs to a VCO (voltage control oscillator) 84. The VCO 84 generates the clock corresponding to the phase difference voltage from the loop filter 83. The clock is supplied to the counter 85 which has the same construction as the counter 81. In the counter 85, the clock from the VCO 84 is frequency-divided in the same manner as the counter 82, and output to the phase detector 82.

Accordingly, the VCO 84 outputs such a clock that the frequency of the frequency-divided transmission channel clock output from the counter 81 and the frequency of the clock output from the counter 85 are equal to each other.

Further, the phase of the clock output from the VCO 84 is controlled by supplying the reset signal to the counter 81 to reset the count value of the counter 81. That is, the clock output from the VCO 84 is synchronized with the timing of the sync.

Here, some time is needed until the PLL circuit is locked. This time is determined by the circuit characteristic of the PLI. circuit. When the time is short, a deviation in the time axial direction, that is, jitter occurs in the clock E(data clock) output from the PLL circuit. If the jitter is large, the sound quality of the audio data is deteriorated, for example. On the other hand, when the time until the PLL circuit is locked is long, the transmission path from the infrared ray emitter 7 until the infrared ray detector 8 is temporarily interrupted, and then even if the infrared ray from the infrared ray emitter 7 can be detected by the infrared ray detector 8, the PLL circuit is not locked for a long time, and thus the output of the DIO data is interrupted during that time, so that it makes an user feel uncomfortable.

Therefore, the loop filter 83 has such a time constant that the time until PLL circuit is locked is in the range of about 1 ms to 500 ms. This is because it has been experimentally proven that when the time until the PLL circuit is locked is set to the above value, the user does not feel acoustically uncomfortable and the sound quality becomes excellent.

Figure 17:
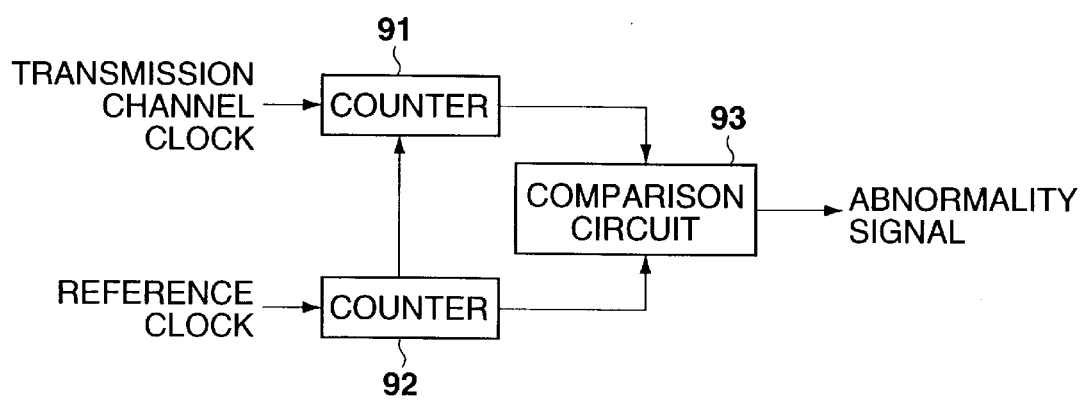
FIG. 17 is a block diagram showing the detailed construction of a frequency check circuit 58 of FIG. 14.

Next, FIG. 17 shows the construction of the frequency check circuit 58 of FIG. 14. A counter 91 is supplied with the transmission channel clock from the transmission channel clock reproducing circuit 52, and the count value is incremented one by one at the timing of the transmission channel clock and output to a comparison circuit 93.

The counter 92 is supplied with a clock having the -same frequency as the transmission channel clock (in this embodiment, the clock of 3.84 MHz) which is supplied from a clock generating circuit as not shown. The counter 92 increments the count value one by one at the timing of the clock, and outputs to the comparison circuit 93.

The counter 92 resets its count value to, for example, zero at a predetermined timing (for example, when the count value is equal to a predetermined value), and outputs the reset signal to the counter 91 at that timing. When receiving the reset signal from the counter 92, the counter 91 resets to zero, for example. Accordingly, the counters 91 and 92 are reset simultaneously.

The comparison circuit 93 compares the count value of the counter 91 with the count value of the counter 92. The comparison circuit 93 judges whether the difference between the count value of the counter 91 and the count value of the counter 92 is within a predetermined error. If the difference between the count value of the counter 91 and the count value of the counter 92 is not within the predetermined error, that is, for example, when the infrared ray detected by the infrared ray detector 8 is not the infrared ray emitted from the infrared ray emitter 7, and thus the count value of the counter 91 is greatly deviated from count value of the counter 92, the signal output from the transmission channel clock reproducing circuit 52 is judged not to be the normal transmission channel clock, so that an abnormality signal is output to the output circuit 57.

As described above, the output circuit 57 stops the output of the DIO format data during the time when receiving the abnormality signal, whereby the output of the DIO format data which are not normal can be prevented.

As described above, the stereophonic audio data which are sampled at 48 kHz in conformity with the IEC 958 format are subjected to the QPSK modulation, and then transmitted at the timing of the transmission channel clock having the frequency which is ⅝-times as high as the data clock. Therefore, the transmission of the audio data with infrared ray can be efficiently performed by using the frequency band of 3 to 6 MHz in the range of 2 to 6 MHz which is defined in CP-1205 of EIAJ and IEC 1603, and the complication of the data processing in the modulation and demodulation processes can be reduced to the minimum level.

Further, there has been hitherto no common signal format to be used for transmission of audio data among the various manufacturers, however, the compatibility between devices can be maintained by integrating the signal formats used for the transmission of audio data with infrared ray in all the manufacturers into the format which has the above-described effect.

In the above case, the signal which has the data rate of 3.072 Mbps and is in conformity with the IEC 958 format is transmitted by one carrier (in this embodiment, the auxiliary carrier wave having the frequency of 4.5 MHz). However, the present invention is applicable to a case where multiplied audio signals of three or more channels are transmitted by one carrier, or a case where the frequency band of 3 to 6 MHz is divided into some bands, and each frequency band is used to transmit plural audio signals while using the center frequency thereof (the center frequency of each band) as carrier.

Figure 18:
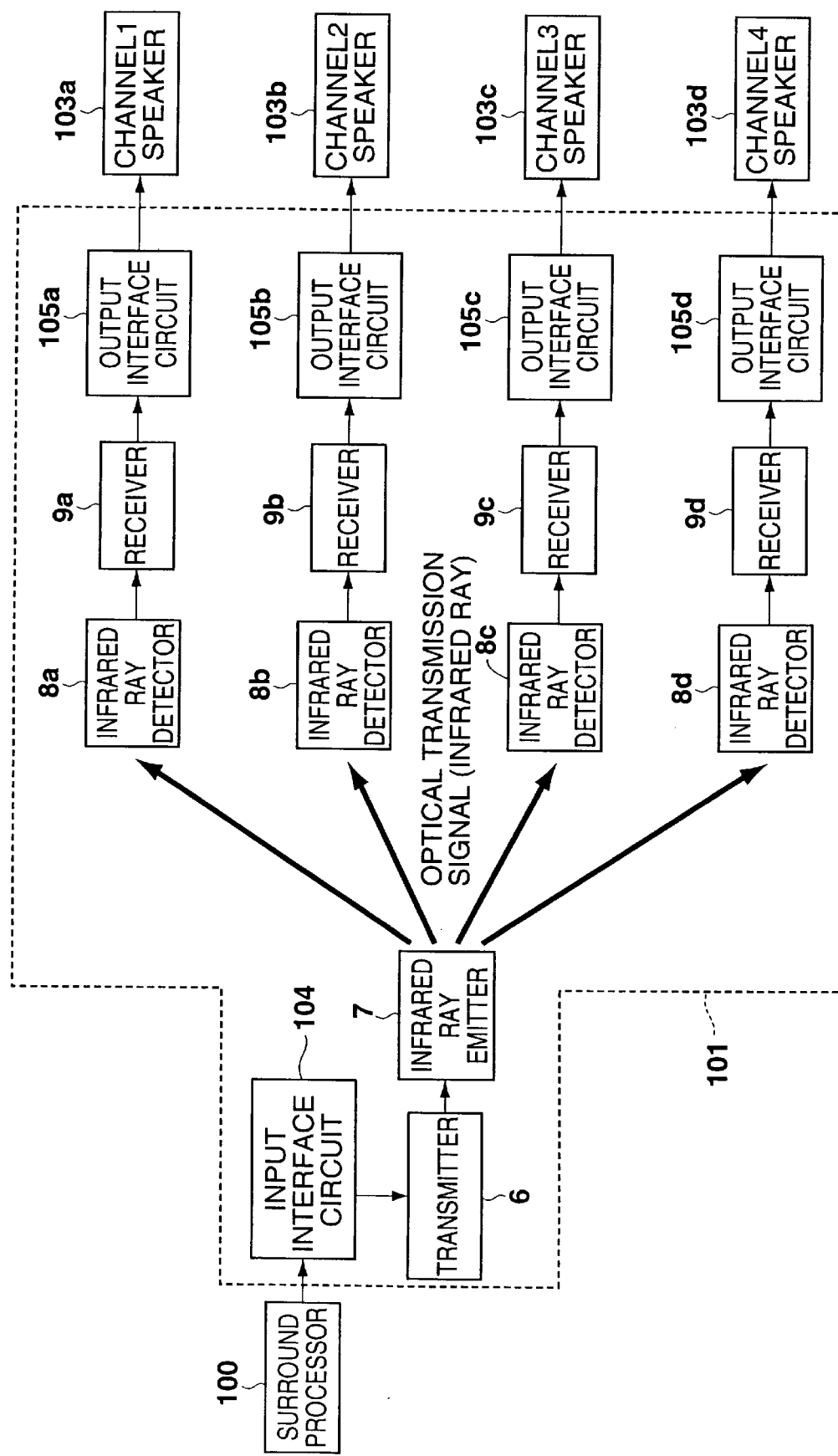
FIG. 18 is a block diagram showing a second embodiment of the audio transmission system to which the present invention is applied.

That is, FIG. 18 shows the construction of a second embodiment of the audio transmission system to which the present invention is applied. In FIG. 18, the portions corresponding to those of FIG. 1 are represented by the same reference numerals, and the description thereof is omitted.

In the audio transmission system, audio signals of four channels which are output from a surround processor 100 as a digital audio instrument are transmitted and output to speakers 103a to 103d as other digital audio instruments through an audio signal transmission device 101.

That is, the surround processor 100 is a reproducing device for reproducing audio signals of plural channels such as four channels, for example, and it reproduces analog or digital audio signals of four channels and outputs the signals through an audio cable or the like to an audio signal transmission device 101.

The audio signal transmission device 101 comprises an input interface circuit 104, a transmitter 6, an infrared ray emitter 7, infrared ray detectors 8a to 8d, receivers 9a to 9d, and output interface circuits 105a to 105d, and it transmits the audio signals from the surround processor 100 to the speakers 103a to 103d.

That is, the input interface circuit 104 receives the audio signals of four first to fourth channels from the surround processor 100. If the signals are analog signals, it samples audio signals of each channel at a predetermined sampling frequency (for example, 48 kHz or the like) of clocks contained therein, and quantized to 16 bits, for example. If the audio signals of first to fourth channels from the surround processor 100 are digital signals, it restricts the word length of each channel to 16 bits, for example. The input interface circuit 104 multiplies the audio signals of 16 bits of the respective first to fourth channels thus obtained to convert the signals to the DIO data, and outputs the DIO data to the transmitter 6.

The transmitter 6 performs the phase-deviation modulation (digital phase modulation) as described above on the output (DIO data) of the input interface circuit 104, and outputs the modulated signals thus obtained to the infrared ray emitter 7. The infrared ray emitter 7 outputs the modulated infrared ray corresponding to the modulated signals from the transmitter 6.

The modulated infrared ray propagates in space, and is detected by the infrared ray detectors 8a to 8d which are designed in the same construction as the infrared ray detector 8. Accordingly, the signals corresponds to the modulated infrared ray, that is, the RF signals corresponding to the modulated signals output from the transmitter 6. The RF signals are supplied to the receivers 9a to 9d which are designed in the same construction as the receiver 9, and the RF signals are demodulated in the respective receivers, whereby the DIO data are reproduced, and output to the output interface circuits 105a to 105d.

In the output interface circuits 105a to 105d, the digital audio signals of the corresponding channel are extracted from the DIO data in which the digital audio signals of the first to fourth channels are multiplexed. That is, in the output interface circuits 105a to 105d, for example, the digital audio signals of the first to fourth digital audio signals are extracted respectively. The output interface circuits 105a to 105d subject the digital audio signals of the first to fourth channels to the D/A conversion to convert the signals to analog audio signals, and output the analog signals to the speakers 103a to 103d respectively, whereby the audio signals of the first to fourth channels are output from the speakers 103a to 103d respectively.

Next, FIGS. 19A to 19D show the format of the DIO data obtained in the input interface circuit 104.

Figure 19A:
FIGS. 19A to 19D show the format of DIO data output from an input interface circuit 104 of FIG. 18.
Figure 19B:
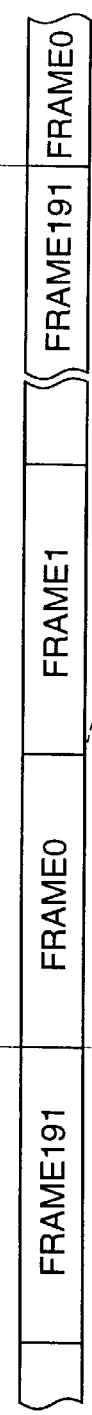
Figure 19C:
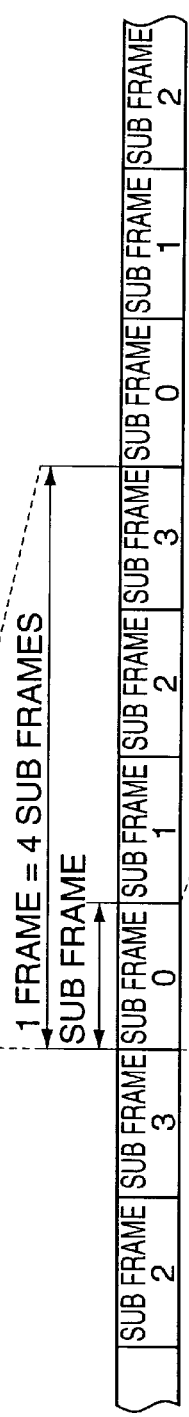
Figure 19D:
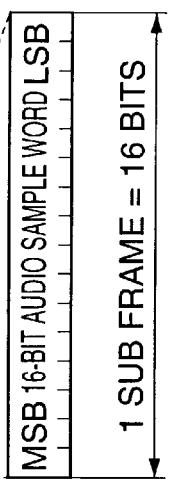

In this case, the DIO data is constructed on a block basis as shown in FIG. 19A, and each block comprises 192 frames as shown in FIG. 19B. Further, each frame comprises four sub frames having the same number of channels as shown in FIG. 19C, and each sub frame comprises an audio sample word of 16 bits as shown in FIG. 19D. As described above, the audio signals of the first to fourth channels whose word length is equal to 16 bits are allocated to the audio sample words of the sub frames 0 to 3 to be multiplexed.

Accordingly, the frame comprises 64 bits (=16 bits×4 sub frames), and the block comprises 1536 bytes (=64 bits×192 frames/8 bits). As a result, the data can be transmitted while disposed in the section of the transmission data show in FIG. 7.

Figure 20:
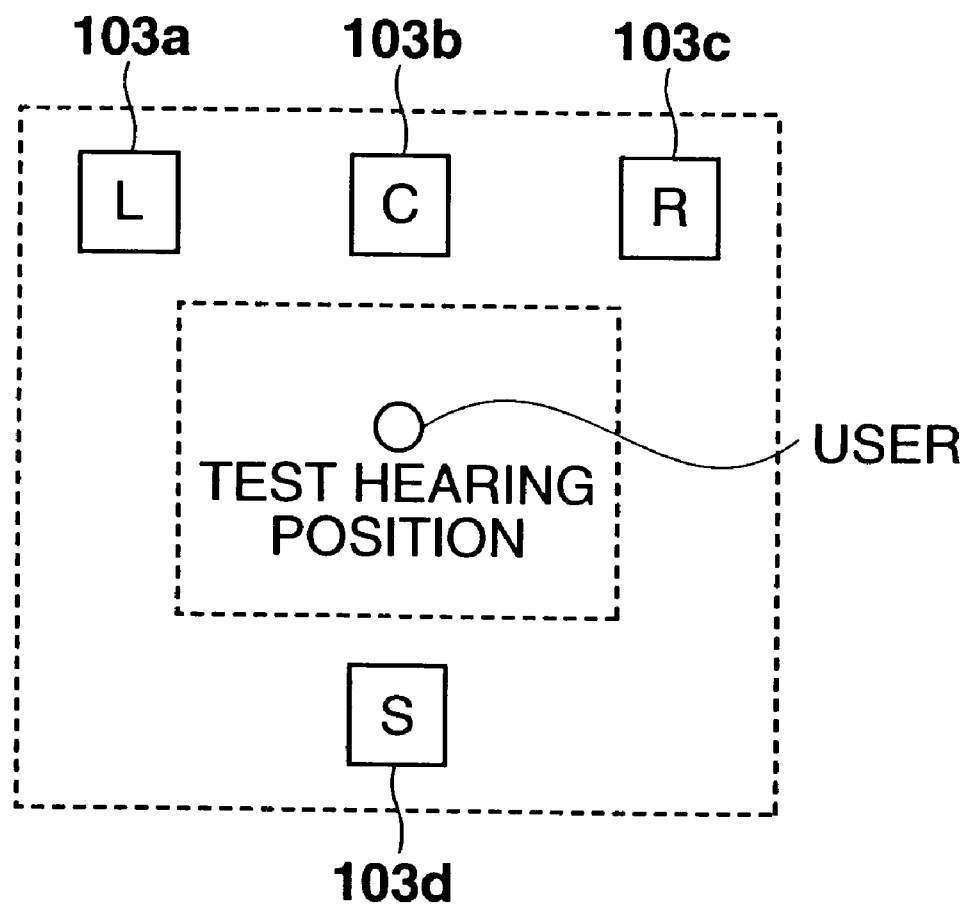
FIG. 20 is a diagram showing a using example of the embodiment of FIG. 18.

As described above, when the audio signals of the four channels are transmitted with infrared ray, for example, as shown in FIG. 20, a left channel (L), a center channel (C), a right channel (R) and a surround channel (S) may be used as the four channels. In this case, the speakers 103a to 103d for outputting the audio signals of the respective channels are preferably disposed far away from one another, however, according to the audio signal transmission device 101, the speakers 103a to 103d can be freely disposed without suffering restriction in length of transmission line, etc., whereby an user can enjoy surround reproduction with high sound quality.

Here, there is no problem when the number of audio signals which will be multiplexed in the input interface circuit 104 is predetermined and the number thereof (number of channels) is fixed. However, when the number of channels is variable, in order to make the output interface 105a (the same is applied in the case of 105b to 105d) extract the audio signals of the corresponding channel, it is necessary to recognize the number of channels whose audio signals are multiplexed. Therefore, it is necessary to transmit the channel number. The channel number is disposed in the header as described with reference to FIGS. 7A to 7C.

As described with reference to FIG. 6, the data disposed in the section is added with an error correction code, and the data disposed in the header is added with no error correction code. However, the error correction code should be added to the channel number, and thus the transmitter 6 is preferably designed to add the error correction code to the header. However, in this case, a block for adding the error correction code in the header is necessary separately from the parity addition circuit 14 for adding the error correction code in the section, and the device is large in size and high in cost.

Therefore, for example, the section may be composed of 1914 bytes by setting 58 bytes in the header of 60 bytes shown in FIGS. 7A to 7C to be contained in the section. In this case, prescribed data are allocated to 48 bytes of 58 bytes, and the error correction codes are allocated to the residual 10 bytes, whereby the device may be altered merely so that the parity addition circuit 14 is set to perform the processing more by only one line (stage) as compared with the case of FIG. 6.

Figure 21:
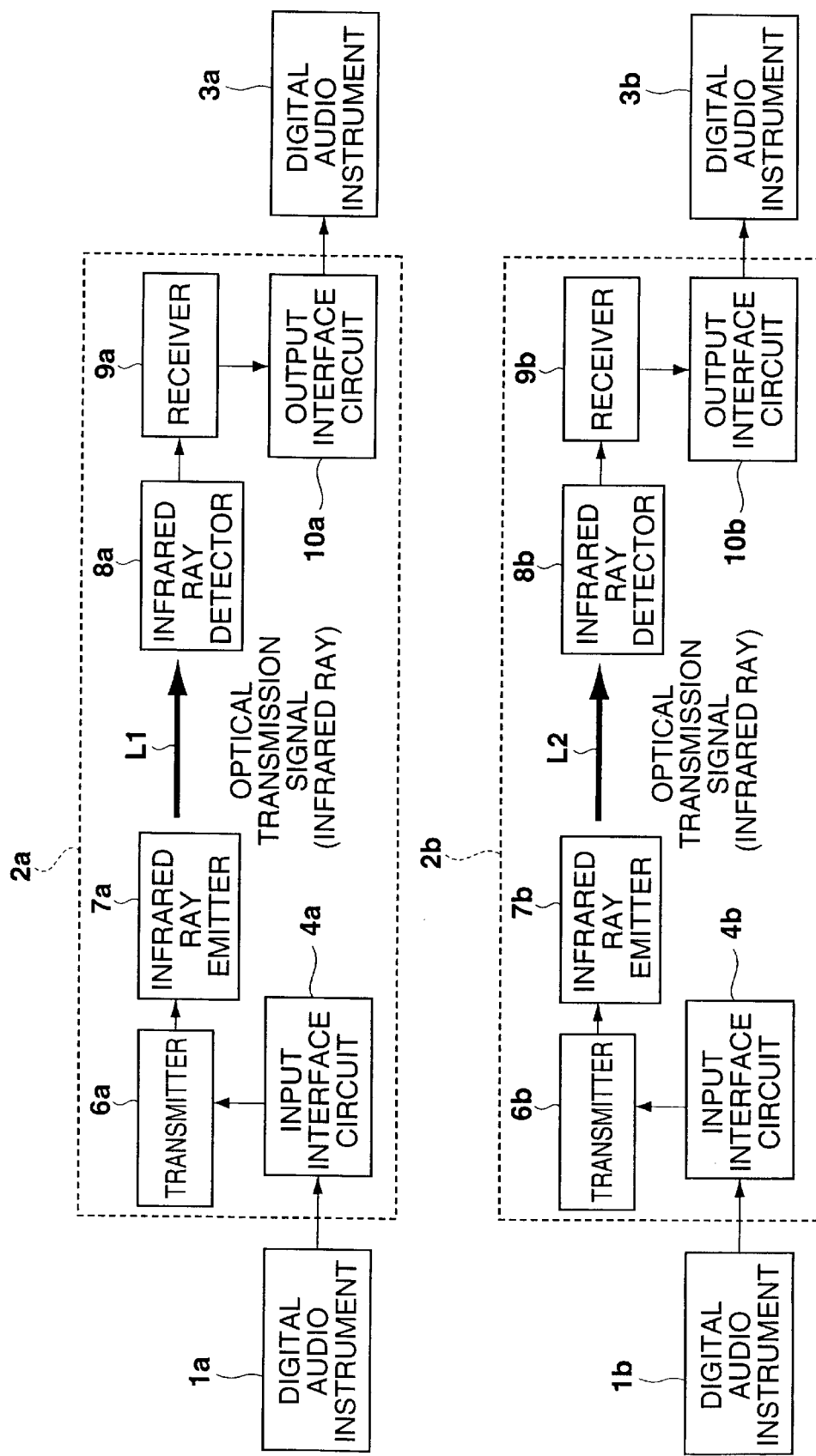
FIG. 21 is a block diagram showing a third embodiment of the audio transmission system to which the present invention is applied.

Next, FIG. 21 shows the construction of a third embodiment of the audio transmission system to which the present invention is applied.

The audio transmission system comprises a combination of two audio transmission systems shown in FIG. 1. That is, digital audio instruments 1a and 1b are designed in the same construction as the digital audio instrument 1 of FIG. 1, audio signal transmission devices 2a and 2b are designed in the same construction as the audio signal transmission device 2 of FIG. 1, and digital audio instruments 3a and 3b are designed in the same construction as the digital audio instrument 3. However, in the transmitters 6a and 6b, the frequency of the auxiliary carrier wave output from the oscillator 28 (FIG. 11) is set to a different value.

That is, in the audio transmission system of FIG. 21, audio signals of two systems (two channels) are transmitted using two carriers (auxiliary carrier wave). Specifically, the frequency band from 3 to 6 MHz is divided into two bands, and the audio signals of the two systems are transmitted by using the two respective bands.

Here, 2 bits of the audio signal is set as 1 symbol in the phase modulation. For example, when the QPSK modulation is used, if the total of the data rate of the audio signals of the two systems is equal to about 3.072 Mbps, the facilitation of manufacturing of band pass filters at the reception side can be promoted, and the modulated signals can be accurately picked up as described above. Therefore, in this case, it is assumed that a half value of 3.072 Mbps, that is, 1.536 Mbps is allocated to each of the audio signals of the two systems.

In this case, the frequency band from 3 to 6 MHz is divided into a band from 3 to 4.5 MHz and a band from 4.5 to 6 MHz, and each of the audio signals of the two systems is transmitted in each of the bands. In the band from 3 to 4.5 MHz, 3.75 MHz which is the center frequency of the band is used as the carrier (auxiliary carrier wave), and in the band from 4.5 to 6 MHz, 5.25 MHz which is the center frequency of the band is used as the carrier (auxiliary carrier wave).

That is, in the transmitter 6a, the QPSK modulation is performed with the auxiliary carrier wave of 3.75 MHz. In the transmitter 6b, the QPSK modulation is performed with the auxiliary carrier wave of 5.25 MHz.

As described above, the audio signals of the two systems are transmitted with the infrared rays (auxiliary carrier wave) of two systems by the frequency band division, and thus the infrared rays do no interfere with each other, so that the audio signals of the two systems can be simultaneously transmitted.

Here, the transmission is performed by dividing the frequency band as described above. For example, stereophonic audio signals which are sampled at 48 kHz and then quantized to 16 bits may be considered as signals having a data rate of 1.536 Mbps.

In order to obtain the transmission data of the format described with reference to FIGS. 7A to 7C, the data disposed in the section is required to be composed of a block of 1856 bytes.

Therefore, in this case, the format of the DIO data output from the input interface circuits 4a and 4b is required to be set as shown in FIGS. 22A to 22D, for example.

Figure 22A:
FIGS. 22A to 22D show the format of DIO data output from an input interface circuit 4a or 4b of FIG. 21.
Figure 22B:
Figure 22C:
Figure 22D:
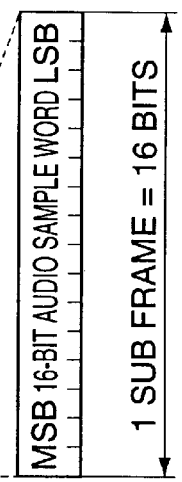

That is, in this case, the DIO data is constructed on a block basis as shown in FIG. 22A, and each block comprises 384 frames as shown in FIG. 22B. Each frame comprises two sub frames 0 and 1 as shown in FIG. 22C, and each sub frame comprises an audio sample word of 16 bits as shown in FIG. 22D. Accordingly, one block comprises data of 1536 bytes (=16 bits×2 sub frames×384 frames/8 bits).

In the output interface circuits 10a and 10b, the DIO data shown in FIGS. 22A to 22D are required to be converted to the DIF data shown in FIG. 3. However, in the case of the DIO data, data disposed in a sub frame has 16 bits while in the case of the DIF data, data of 24 bits are required to be disposed in an audio sample word. Therefore, in the output interface circuits 10a and 10b, a dummy bit of 8 bits (for example, 0 or the like) is added to the data of 16 bits (audio sample word) disposed in the sub frame to obtain data of 24 bits, and then the data of 24 bits thus obtained are disposed in the audio sample word of the DIF data.

Figure 23:
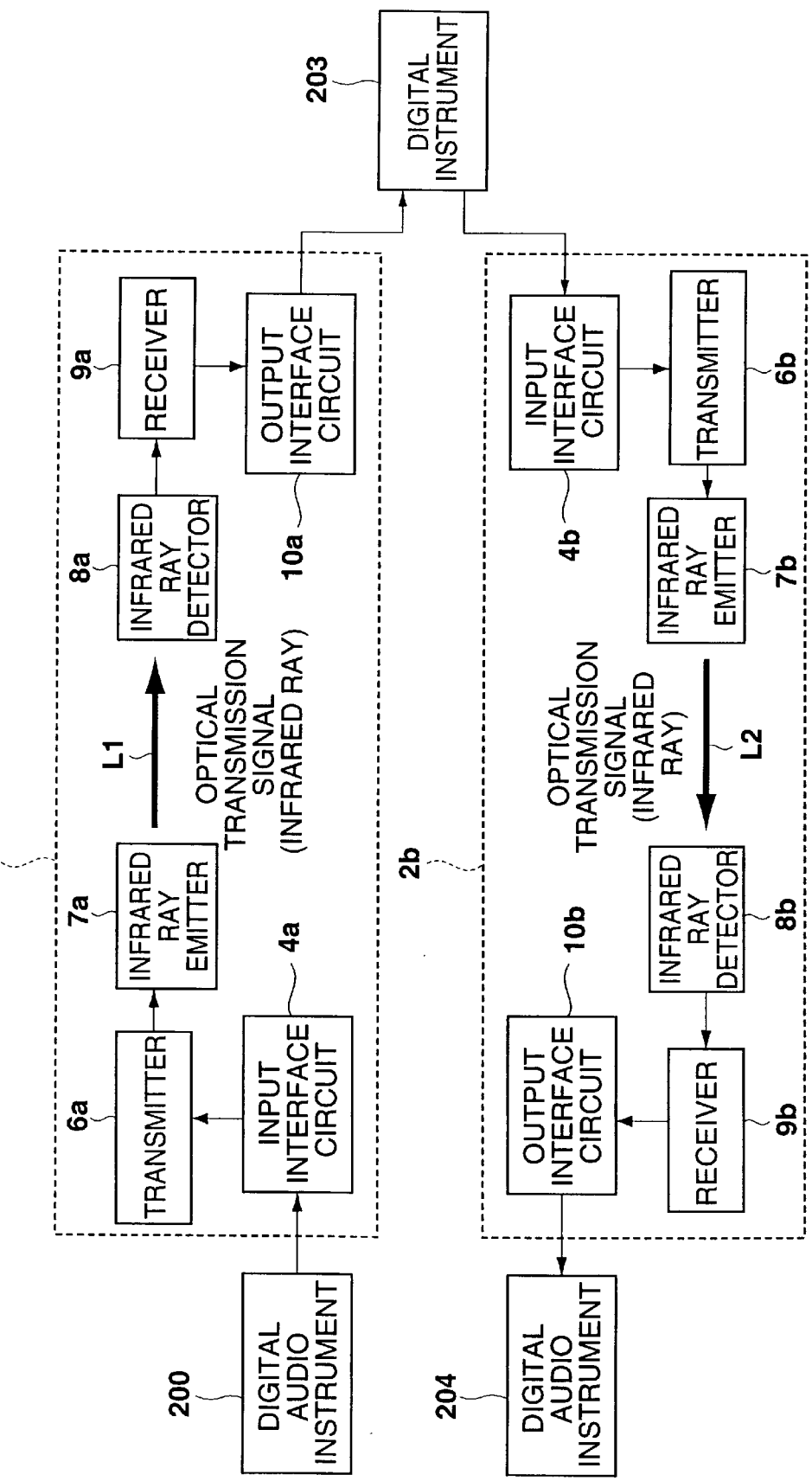
FIG. 23 is a block diagram showing a fourth embodiment of the audio transmission system to which the present invention is applied.

Next, FIG. 23 shows the construction of a fourth embodiment of the audio transmission system to which the present invention is applied. In FIG. 23, the portions corresponding to those of FIG. 21 are represented by the same reference numerals, and the description thereof is omitted as necessary.

In the audio transmission system of this embodiment, audio signals are output from a digital audio instrument 200 such as a DAT reproducing device, a mini-disk reproducing device or the like through an audio signal transmission device 2a to a digital audio recorder 203 which can record and reproduce the audio signals, such as a mini-disk reproducing device or the like. In the digital audio recorder 203, the audio signals from the audio signal transmission device 2a are recorded on a recording medium such as a mini disk or the like, and the recording content is immediately reproduced. The audio signals thus obtained are supplied as a monitor output to the audio signal transmission device 2b.

In the audio signal transmission device 2b, the audio signals as the monitor output which are supplied from the digital audio recorder 203 are transmitted with infrared ray, and supplied to the digital audio instrument 204. The digital audio instrument 204 comprises a speaker, a headphone or the like, for example, and the audio signals transmitted through the audio signal transmission device 2b are output to the digital audio instrument.

According to the audio transmission system as described above, the audio signals reproduced in the digital audio instrument 200 can be recorded in the digital audio recorder 203 which is located away. Further, by listening to the audio signals transmitted as the monitor output, it can be checked whether the digital audio recorder 203 operates normally.

The receiver 9b of the audio signal transmission device 2b may be designed to selectively receive not only the modulated signals output from the transmitter 6b thereof, but also the modulated signals output from the transmitter 6a of the audio signal transmission device 2a. In this case, the user can select on hand any one of the audio signals (source) output from the digital audio instrument 200 and the monitor output which is output from the digital audio instrument 203.

Figure 24:
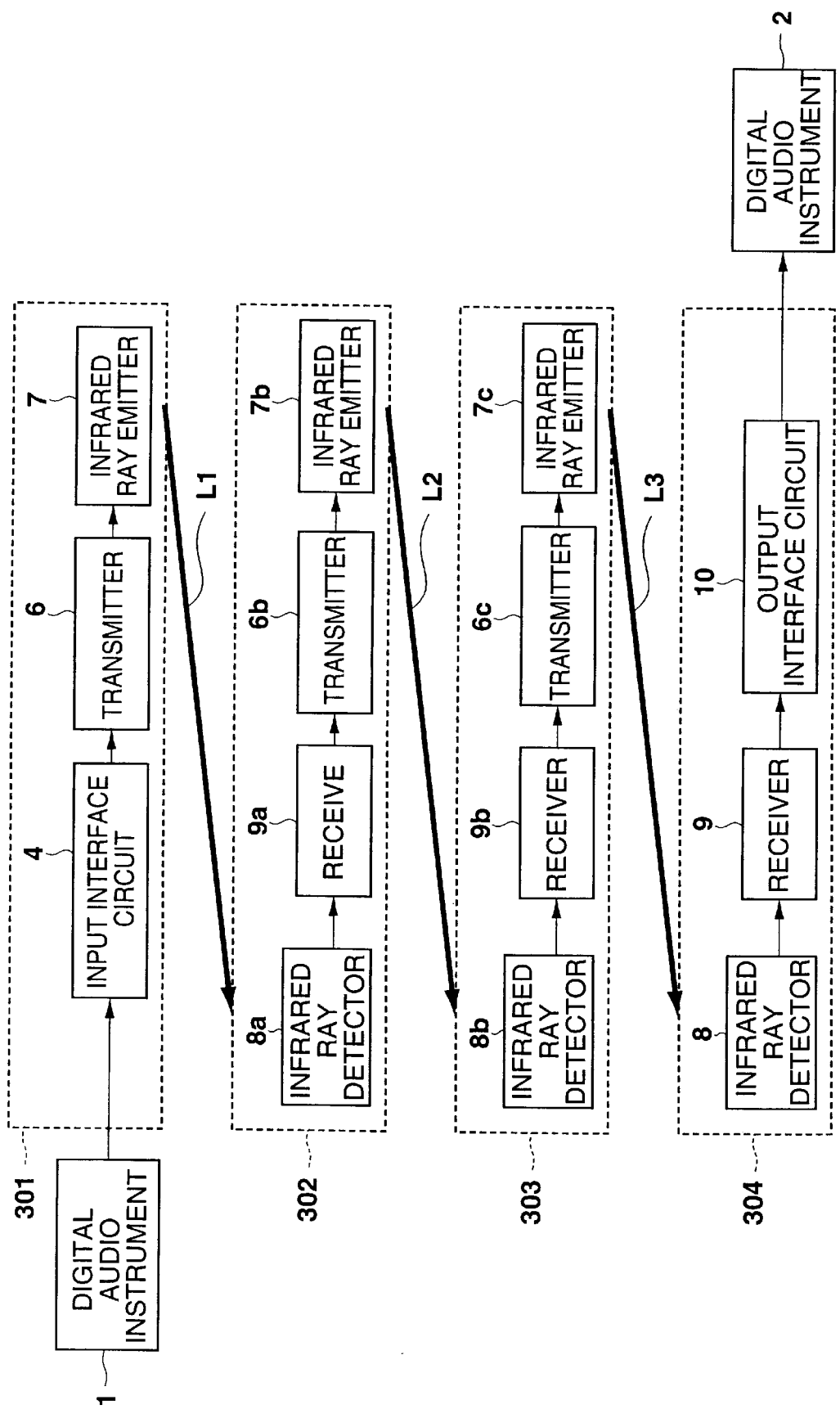
FIG. 24 is a block diagram showing a fifth embodiment of the audio transmission system to which the present invention is applied.

Next, FIG. 24 shows the construction of a fifth embodiment of the audio transmission system to which the present invention is applied. The corresponding portions to FIGS. 1, 18, 21 or 23 are represented by the same reference numerals, and the description thereof is omitted as necessary.

The audio transmission system of this embodiment comprises digital audio instruments 1, 3, an audio signal transmission device 301, audio signal relay devices 302, 303, and an audio signal reception device 304. By this audio transmission system, the optical space transmission at a longer distance can be performed as compared with the case of FIG. 1.

That is, the audio signals output from the digital audio instrument 1 are supplied to the audio signal transmission device 301. The audio signal transmission device 301 comprises an input interface circuit 4, a transmitter 6 and an infrared ray emitter 7, and it transmits the audio signals from the digital audio instrument 1 with infrared ray. The infrared ray is received by the audio signal relay device 302.

The audio signal relay device 302 comprises an infrared ray detector 8a, a receiver 9a, a transmitter 6b and an infrared ray emitter 7b which are designed in the same construction as the infrared ray detector 8, the receiver 9, the transmitter 6 and the infrared ray emitter 7, respectively. It receives and demodulates the infrared ray from the audio signal transmission device 301 to obtain the original audio signals. Further, the audio signal relay device 302 transmits the audio signals through the transmitter 6b and the infrared ray emitter 7b with infrared ray. This infrared ray is received by the audio signal relay device 302. Accordingly, the audio signal relay device 302 relays the infrared ray from the audio signal transmission device 301, and then supplies it to the audio signal relay device 303.

The audio signal relay device 303 also comprises an infrared ray detector 8b, a receiver 9b, a transmitter 6c and an infrared ray emitter 7c which are designed in the same construction as the infrared ray detector 8, the receiver 9, the transmitter 6 and the infrared ray emitter 7 respectively, and it relays the infrared ray from the audio signal relay device 302 and supplies it to the audio signal reception device 304.

The audio signal reception device 304 comprises the infrared ray detector 8, the receiver 9c and the output interface circuit 10, and it receives the infrared ray from the audio signal relay device 303 to reproduce the original audio signals and outputs the signals to the digital audio instrument 3.

Auxiliary carriers having different frequencies are used in the transmitters 6 and 6b and the transmitters 6b and 6c. That is, for example, it is now assumed that the frequency band from 3 MHz to 6 MHz is divided into two bands for the transmission. In the transmitters 6 and 6c, the auxiliary carrier wave of 3.75 MHz is used, and in the transmitter 6b, the auxiliary carrier wave of 5.25 MHz is used, whereby in the audio signal relay devices 302 and 303, the interference between the infrared ray emitted from themselves and the received infrared ray can be prevented.

As described above, the audio transmission system is constructed by the audio signal transmission device 301, the audio signal relay devices 302, 303 and the audio signal reception device 304, whereby the extremely-long-distance optical transmission can be performed.

Here, in the embodiment shown in FIG. 24, the two audio signal relay devices 302 and 303 are provided between the audio signal transmission device 301 and the audio signal reception device 304. However, only one audio signal relay device or three or more audio signal relay devices may be provided. At any rate, it is necessary to set the frequencies of the auxiliary carriers of the infrared ray emitted from itself and the received infrared ray to different values in order to prevent the interference (it is necessary that the frequency bands are not overlapped with each other).

In this embodiment, the data are transmitted while subjected to the QPSK modulation. However, the audio data may be transmitted while subjected to phase-shift modulation such as BPSK (Binary Phase Shift Keying) modulation, QAM (Quadrature Amplitude Modulation) modulation (Amplitude Phase Shift Modulation).

In this embodiment, the scramble is performed in the modulation circuit 16, however, the scramble may be performed in the transmission format generating circuit 15, for example. Likewise, the descramble may be performed not in the demodulation circuit 51, but in the transmission format reproducing circuit 54.

Further, in this embodiment, it is checked in the receiver 9 whether the transmission channel clock output from the transmission channel clock reproducing circuit 52 is normal. This check may be performed, not on the transmission channel clock, but also on the data clock output from the data clock reproducing circuit 53. In the data clock reproducing circuit 53, the data clock is generated on the basis of the transmission channel clock, and thus the same effect as the transmission channel clock can be obtained by checking the data clock.

Further, in this embodiment, the phase of the data clock is controlled by resetting the counter 81 of the PLL circuit (FIG. 16) contained in the data clock reproducing circuit 53. However, the control of the phase of the data clock may be performed by installing the PLL circuit having the same construction as the PLL circuit shown in FIG. 16 in the transmission channel clock reproducing circuit 52 to control the phase of the transmission channel clock. In this case, jitter can be prevented from occurring in the transmission channel clock output from the transmission channel clock reproducing circuit 52. With respect to the PLL circuit contained in the transmission channel clock signal reproducing circuit 52, a time required until the PLL circuit is locked is preferably set to the range from 1 ms to 500 ms as in the case of the PLL circuit contained in the data clock reproducing circuit 53.

Further, in this embodiment, the random code is generated by using the M sequence in the random sequence generating circuit 31 (the same is satisfied in the random sequence generating circuit 71). However, the random code may be generated using a sequence other than the M sequence or subjecting the M sequence and a sequence other than the M sequence to exclusive OR.

Still further, in this embodiment, the parity addition circuit 14 is not supplied with the transmission channel clock in FIG. 5. However, the parity addition circuit 14 may be supplied with a transmission channel clock, and it is operated in accordance with the timing thereof.

In this embodiment, the transmitter 6 and the infrared ray emitter 7 are designed as separate devices. However, the transmitter 6 and the infrared ray emitter 7 may be fabricated into one body. Likewise, the infrared ray detector 8 and the receiver 9 may be fabricated into one body.

In this embodiment, in the error correction circuit 56, the distance d of the correction code to enable the error detection and the error correction permissible range r are set to 11 and 4 respectively, and the error correction is performed in this range. However, the distance d of the error code and the error correction permissible range r are not limited to these values, and for example, these values may satisfy the equation d>2r.

In this embodiment, the digital audio signals are transmitted using the frequency band from 3 to 6 MHz. However, the digital audio signals may be transmitted by using another frequency band.

The data rate described in the above embodiment is for the case where the sampling frequency is equal to 48 kHz. Accordingly, for example, when the sampling frequency is equal to 44.1 kHz or 32 kHz, the data rate is (44.1 kHz/48 kHz)-times or (32 kHz/48 kHz)-times.

In this embodiment, the data write-in direction and the data read-out direction to the buffer circuit 13 are set to be different to perform the interleave operation, thereby enhancing the resistance to the burst error. In place of this the data write-in direction and the data read-out direction to the buffer circuit 13 may be set to be coincident with each other so that the interleave operation is not performed. That is, the interleave makes the error correction possible by dispersing the errors. However, for example, in the case where when audio signals are compressed, an error occurs at a portion to which information indispensable for the demodulation of the audio signals is concentrated because of the interleave operation, the demodulation of all the audio signals for which the information is required cannot be performed even by dispersing the errors. In this case, it is impossible to obtain audio signals for a long term. On the other hand, if the interleave operation is not performed, the information indispensable for the demodulation is not concentrated. Therefore, even when errors occur at a portion containing such information, only the demodulation of audio signals using the information cannot be performed, and consequently such a situation that audio signals cannot be obtained for a long term can be prevented.

In this embodiment, the error correction code is added in an oblique direction (FIG. 6), however, the error correction code may be added in the same direction (L direction) as the write-in direction of the audio data, for example.

According to the transmission device and the transmission method of the present invention, the digital data which are modulated in the biphase mark system are demodulated, and the format thereof is converted. Further, on the basis of the conversion result, the auxiliary carrier wave is subjected to the phase-shift modulation, and the modulated signals are output. Thereafter, on the basis of the modulated signals, the infrared ray serving as the main carrier wave is modulated, and the modulated infrared ray thus obtained is output. The modulated infrared ray is detected, and the reception signals corresponding to the modulated signals are output. The reception signals are demodulated and inversely converted to the digital data which are modulated in the biphase mark system. In this case, the transmission rate of the digital data is set to the rate corresponding to the frequency of ⅝-times data clock. Accordingly, the infrared-ray based transmission of the digital data which is in conformity with the standards can be efficiently performed with minimizing the complication of the data processing in the modulation and demodulation processes.

According to the transmission device and the transmission method of the present invention, in the transmission device, the digital data of plural channels are multiplexed, the auxiliary carrier wave is subjected to the phase-shift modulation on the multiplexing result, and the modulated signals are output. Further, on the basis of the modulated signals, the infrared ray serving as the main carrier wave is modulated, and the modulated infrared ray thus obtained is output. On the other hand, at the reception device, the modulated infrared ray is detected, and the reception signals corresponding to the modulated signals are output. Further, the reception signals are demodulated, and the digital data of a predetermined channel are extracted. In this case, the transmission rate of the digital data is set to the rate corresponding to the frequency of ⅝-times the data clock. Accordingly, the infrared-ray based transmission of the digital data of plural channels which is in conformity with the standards can be efficiently performed with minimal data processing complications in the modulation and demodulation processes.

According to the transmission device of the present invention, the auxiliary carrier wave is subjected to the phase-shift modulation on the basis of the first or second digital data, and the modulated signals corresponding to the first or second digital data. Further, the infrared ray serving as the main carrier wave is modulated on the basis of the modulated signals, whereby the modulated infrared rays corresponding to the first or second digital data is output. These modulated infrared rays are detected, and the reception signals corresponding to the modulated signals are output. Further, the reception signals corresponding to the first or second digital data are demodulated, thereby reproducing the first or second digital data. In this case, the first or second digital data are transmitted while modulated at the timing of the transmission channel clock of the frequency of ⅝-times the data clock. The first or second digital data are reproduced at the timing of the data clock. Accordingly, the infrared-ray based transmission of the digital data which is in conformity with the standards can be efficiently performed with minimizing the complication of the data processing in the modulation and demodulation processes.

According to the transmission device of the present invention, the first auxiliary carrier wave is subjected to the phase-shift modulation on the basis of the digital data, and the modulated signals are output. Further, on the basis of the modulated signals, the infrared ray serving as the main carrier wave is modulated, and the modulated infrared ray thus obtained is output. The modulated infrared ray is detected, and the reception signals corresponding to the modulated signals are output. The reception signals are demodulated to reproduce the digital data. On the basis of the digital data, the second auxiliary carrier wave is subjected to the phase shift modulation, and the modulated signals are output. On the basis of the modulated signals, the infrared ray serving as the main carrier wave is modulated, and the modulated infrared ray thus obtained is output. The modulated infrared ray is detected, and the reception signals corresponding to the modulated signals are output. The reception signals are demodulated to reproduce the digital data. In this case, the digital data are transmitted while modulated at the timing of the transmission channel clock the frequency of ⅝-times of the data clock. The digital data are reproduced at the timing of the data clock. Accordingly, the infrared-ray based transmission of the digital data which is in conformity with the standards can be efficiently performed with minimal data processing complications in the modulation and demodulation processes.

Various modification, improvements and applications may be made to the above embodiments without departing from the subject matter of the present invention, and thus the present invention is not limited to the above-described embodiments.

What is claimed is:

1. A transmission device for transmitting data, comprising:

conversion means for demodulating a digital data which is modulated in a biphase mark system and converting the digital data to an output signal of a predetermined format;

means for subjecting an auxiliary carrier wave to a phase-shift modulation on the basis of the output signal of said conversion means and outputting a modulation signal; and means for modulating an infrared ray serving as a main carrier wave on the basis of the modulation signal and outputting modulated infrared ray;

wherein said means for subjecting said auxiliary carrier wave to said phase shift modulation includes generating means for generating a transmission channel clock having a frequency which is five-fourth a data clock of the digital data on the basis of the digital data, and outputs the modulation signal at the timing of the transmission channel clock.

2. The device of claim 1 wherein said phase-shift modulation includes a QPSK modulation.

3. The device of claim 1 wherein said modulation signal includes an RF signal.

4. The device of claim 1 wherein said conversion means alters a preamble of said demodulated digital data to a data of 4 bits.

5. The device of claim 1 wherein said predetermined format includes IEC 958 format.

6. A reception device for receiving data, comprising:

light receiving means for receiving a modulated infrared ray which is obtained by modulating an infrared ray serving as a main carrier wave on the basis of a modulation signal, wherein the modulation signal is obtained by subjecting an auxiliary carrier wave to a phase-shift modulation on the basis of a signal of a predetermined format and transmitted at the timing of a transmission channel clock having a frequency which is five-fourth the digital data, said light receiving means outputting a reception signal corresponding to the modulation signal on the basis of the modulated infrared ray;

demodulation means for demodulating the reception signal and outputting a demodulation signal; and conversion means for converting the demodulation signal to a digital data which is modulated in a biphase mark system;

wherein said demodulation means includes data clock generating means for generating a data clock on the basis of the reception signal, and outputs the demodulation signal at the timing of the data clock.

7. The device of claim 6 wherein said phase-shift modulation includes a QPSK modulation.

8. The device of claim 6 wherein said modulation signal includes an RF signal.

9. A transfer device comprising a transmitter and a receiver, wherein said transmitter comprises:
- conversion means for demodulating digital data which are modulated in a biphase mark system and converting the digital data to an output signal of a predetermined format;
- means for subjecting an auxiliary carrier wave to a phase-shift modulation on the basis of the output signal of said conversion means and outputting a modulation signal; and
- means for modulating infrared ray serving as a main carrier wave on the basis of the modulation signal and outputting modulated infrared ray; and wherein said receiver comprises:
- light receiving means for receiving the modulated infrared ray and outputting a reception signal corresponding to the modulation signal on the basis of the modulated infrared ray;
- demodulation means for demodulating the reception signal and outputting the demodulation signal; and
- conversion means for converting the demodulation signal to digital data which are modulated in a biphase mark system,
  - wherein said means for subjecting said auxiliary carrier wave to a phase-shift modulation includes generating means for generating a transmission channel clock having a frequency which is five-fourth a data clock of the digital data on the basis of the digital clock, and outputs the modulation signal at the timing of the transmission channel clock, and further wherein said demodulation means includes data clock generating means for generating a data clock on the basis of the reception signal and outputs the demodulation signal at the timing of the data clock.

10. The device of claim 9 wherein said phase-shift modulation includes a QPSK modulation.

11. The device of claim 9 wherein said modulation signal includes an RF signal.

12. The device of claim 9 wherein said conversion means alters a preamble of said demodulated digital data to a data of 4 bits.

13. The device of claim 9 wherein said predetermined format includes IEC 958 format.

14. A transmission method for transmitting data, comprising the steps of:
- demodulating a digital data which is modulated in a biphase mark system and converting the digital data to an output signal of a predetermined format;
- subjecting an auxiliary carrier wave to a phase-shift modulation on the basis of the output signal and outputting a modulation signal; and
- modulating an infrared ray serving as a main carrier wave on the basis of the modulation signal and outputting modulated infrared ray,
  - wherein said step of subjecting said auxiliary carrier wave includes the step of generating a transmission channel clock having a frequency which is five-fourth a data clock of the digital data on the basis of the digital data, and outputs the modulation signal at the timing of the transmission channel clock.

15. The method of claim 14 wherein said phase-shift modulation includes a QPSK modulation.

16. The method of claim 14 wherein said modulation signal includes an RF signal.

17. The method of claim 14 wherein said step of demodulating includes the step of altering a preamble of said demodulated digital data to a data of 4 bits.

18. A reception method for receiving data, comprising the steps of:
- receiving a modulated infrared ray by modulating an infrared ray serving as a main carrier wave on the basis of a modulation signal, wherein the modulation signal is obtained by subjecting an auxiliary carrier wave to a phase-shift modulation on the basis of a signal of a predetermined format and transmitted at the timing of a transmission channel clock having a frequency which is five-fourth the digital data, said [light] receiving step including the step of outputting the reception signal corresponding to the modulation signal on the basis of the modulated infrared ray;
- demodulating the reception signal and outputting the demodulation signal; and
- converting the demodulation signal to a digital data which is modulated in a biphase mark system,
  - wherein said demodulation step includes the steps of generating a data clock on the basis of the reception signal and outputting the demodulation signal at the timing of the data clock.

19. The method of claim 18 wherein said phase-shift modulation includes a QPSK modulation.

20. The method of claim 18 wherein said modulation signal includes an RF signal.

21. A transfer method comprising a transmission step and a reception step, wherein said transmission step comprises the steps of:
- demodulating digital data which are modulated in a biphase mark system and converting the digital data to an output signal of a predetermined format;
- subjecting an auxiliary carrier wave to a phase-shift modulation on the basis of the output signal and outputting a modulation signal; and
- modulating infrared ray serving as a main carrier wave on the basis of the modulation signal and outputting modulated infrared ray, and wherein said reception step comprises:
- receiving the modulated infrared ray and outputting the reception signal corresponding to the modulation signal on the basis of the modulated infrared ray;
- demodulating the reception signal and outputting the demodulation signal; and
- converting the demodulation signal to digital data which are modulated in a biphase mark system,
  - wherein said step of subjecting said auxiliary carrier wave to a phase-shift modulation includes the steps of generating a transmission channel clock having a frequency which is five-fourth a data clock of the digital data on the basis of the digital clock, and outputting the modulation signal at the timing of the transmission channel clock, and
  - wherein said demodulation step includes the steps of generating a data clock on the basis of the reception signal and outputting the demodulation signal at the timing of the data clock.

22. The method of claim 21 wherein said phase-shift modulation includes a QPSK modulation.

23. The method of claim 21 wherein said modulation signal includes an RF signal.

24. The method of claim 21 wherein said step of demodulating includes the step of altering a preamble of said demodulated digital data to a data of 4 bits.

25. A transmission device for transmitting data, comprising:
  input interface means for receiving a digital data of plural channels and outputting an output signal of a predetermined format;
  means for subjecting an auxiliary carrier wave to a phase-shift modulation on the basis of the output signal from said input interface me and outputting a modulation signal; and
  means for modulating an infrared ray serving as a main Prier wave on the basis of the modulation signal and outputting a modulated infrared ray,
    wherein said means for subjecting said auxiliary carrier wave to a phase-shift modulation includes the step of generating a transmission channel clock leaving a frequency which is five-fourth a data clock of the digital data on the basis of the digital data, and outputs the modulation signal at the timing of the transmission channel clock.

26. A reception device for receiving data comprising:
  light receiving means for receiving a modulated infrared ray which is obtained by modulating an infrared ray serving as a main carrier wave on the basis of a modulation signal, wherein the modulation signal is obtained by subjecting a phase-shift modulation to an auxiliary carrier wave on the basis of an output signal obtained by converting the digital data of the plural channels to said output sisal of a predetermined format, said light receiving means outputting a reception signal corresponding to the modulation signal on the basis of the modulated infrared ray;
  demodulation means for demodulating the reception signal and outputting a demodulation signal; and
  extraction means for extracting the digital data of a predetermined channel from the demodulation signal,
    wherein said demodulation means includes data clock generating means for generating a data clock on the basis of the reception signal, and outputs the demodulation signal at the timing of the data clock.

27. A transfer device comprising a transmitter and a receiver,
  wherein said transmitter comprises:
    input interface means for receiving a digital data of plural channels and outputting an output signal of a predetermined format;
    means for subjecting an auxiliary carrier wave to a phase-shift modulation on the basis of the output signal from said input interface means and outputting a modulation signal; and
    means for modulating an infrared ray serving as a main carrier wave on the basis of the modulation signal and outputting a modulated infrared ray, and
  wherein said receiver comprises:
    light receiving means for receiving the modulated infrared ray and outputting a demodulation signal; and
    extraction means for extracting a digital data of a predetermined channel from the demodulation signal,
    wherein said means for subjecting said auxiliary carrier wave to a phase-shift modulation includes generating means for generating a transmission channel clock having a frequency which is five-fourth a digital data data clock on the basis of the digital data, and outputs the modulation signal at the timing of the transmission channel clock, and
    wherein said demodulating means has data clock generating means for generating a data clock on the basis of the reception signal and outputs the demodulation signal at the timing of the data clock.

28. A transmission method for transmitting data comprising the steps of:
  receiving a digital data of plural channels and outputting an output signal;
  subjecting an auxiliary carrier wave to a phase-shift modulation on the basis of the output signal and outputting a modulation signal; and
  modulating an infrared ray serving as a main carrier wave on the basis of the modulation signal and outputting a modulated infrared ray,
    wherein said step of subjecting said auxiliary carrier wave to a phase-shift modulation includes the step of generating a transmission channel clock having a frequency which is five-fourth a data clock of the digital data on the basis of the digital data, and outputs the modulation signal at the timing of the transmission channel clock.

29. A reception method for receiving data comprising the steps of:
  receiving a modulated infrared ray which is obtained by modulating an infrared ray serving as a main carrier wave on the basis of a modulation signal, wherein the modulation signal is obtained by subjecting a phase-shift modulation to an auxiliary carrier wave on the basis of an output signal obtained by converting a digital data of the plural channels to said output signal of a predetermined format, said step of receiving further including the step of outputting a reception signal corresponding to the modulation signal on the basis of the modulated infrared ray;
  demodulating the reception signal and outputting a demodulation signal; and
  extracting the digital data of a predetermined channel from the demodulation signal,
    wherein said demodulation step includes the steps of generating a data clock on the basis of the reception signal and outputting the demodulation signal at the timing of the data clock.

30. A transfer method comprising a transmission step and a reception step,
  wherein said transmission step comprises the steps of:
    receiving a digital data of a plurality of channels and outputting an output signal;
    subjecting an auxiliary carrier wave to a phase-shift modulation on the basis of the output signal and outputting a modulation signal; and
    modulating an infrared ray serving as a main carrier wave on the basis of the modulation signal and outputting a modulated infrared ray, and
  wherein said reception step comprises the steps of:
    receiving the modulated infrared ray and outputting a demodulation signal; and
    extracting digital data of a predetermined channel from the demodulation signal,
    wherein said step of subjecting said auxiliary carrier wave to said phase-shift modulation includes the step of generating a transmission channel clock having a frequency which is five-fourth a data clock of the digital data on the basis of the digital data, and outputs the modulation signal at the timing of the transmission channel clock, and
    wherein said receiving step includes the step of generating the data clock on the basis of a reception signal and outputs the demodulation signal at the timing of the data clock.

31. A transfer device comprising a plurality of transmitters receivers, wherein each of said plurality of transmitters comprises:
  means for subjecting an auxiliary carrier wave to a phase-shift modulation on the basis of a digital data and outputting a modulation signal;
  means for modulating an infrared ray serving as a main carrier wave on the basis of the modulation signal; and
  light receiving means for receiving the modulated infrared ray and outputting a reception signal corresponding to the modulation signal on the basis of the modulated infrared ray, and wherein each of said plurality of receivers comprises:
  demodulation means for demodulating the reception signal and outputting a demodulation signal; and
  conversion means for converting the demodulation signal to a digital data,
    wherein said means for subjecting said auxiliary carrier wave to said phase-shift modulation includes generating means for generating a transmission channel clock having a frequency which is five-fourth a data clock of the digital data on the basis of the digital data, and outputs the demodulation signal at the timing of the transmission channel clock, and
    wherein said demodulation means has data clock generating means for generating a data clock on the basis of the reception signal and outputs the demodulation signal at the timing of the data clock.

32. The transfer device of claim 31 wherein the output signal of at least one of said plurality of receivers is supplied to a recording and/or reproducing device, and the output signal from said recording and/or reproducing device is supplied to at least one of said plurality of transmitters.

33. A relay device for receiving a first output signal from a transmission device and transmitting a second output signal to a reception device, comprising:
  light receiving means for receiving first modulated infrared ray from said transmission device, wherein the first modulated infrared ray is obtained by modulating an infrared ray serving as a main carrier wave on the basis of a first modulation signal, and the first modulation signal is obtained by subjecting a first auxiliary carrier wave to a phase-shift modulation on the basis of a signal of a predetermined format and output at the timing of a transmission channel clock having a frequency which is five-fourth the digital data, said light receiving means outputting a reception signal corresponding to the first modulation signal on the basis of the modulated infrared ray;
  demodulation means for demodulating the reception signal and outputting digital data;
  means for subjecting a second auxiliary carrier wave to the phase-shift modulation on the basis of the digital data from said demodulation means, and outputting a second modulation signal; and means for modulating said infrared ray serving as a main carrier wave on the basis of the second modulation signal and outputting second modulated infrared ray to be transmitted to said reception device,
    wherein said demodulation means has data clock generating means for generating a data clock on the basis of the reception signal, and outputs the demodulation signal at the timing of the data clock, and
    wherein said means for subjecting the second auxiliary carrier wave to the phase-shift modulation includes generating means for generating a transmission channel clock having a frequency which is five-fourth the data clock on the basis of the digital data, and outputs the digital data at the timing of the transmission channel clock.

34. A relay method for receiving a first output signal from a transmission device and transmitting a second output signal to a reception device, comprising the steps of:
  receiving first modulated infrared ray from said transmission device, wherein the first modulated infrared ray is obtained by modulating an infrared ray serving as a main carrier wave on the basis of a first modulation signal, and the first modulation signal is obtained by subjecting a first auxiliary carrier wave to a phase-shift modulation on the basis of a signal of a predetermined format and output at the timing of a transmission channel clock having a frequency which is five-fourth the digital data, said receiving step including the step of outputting a reception signal corresponding to the first modulation signal on the basis of the modulated infrared ray;
  demodulating the reception signal and outputting a digital data;
  subjecting a second auxiliary carrier wave to the phase-shift modulation on the basis of the digital data, and outputting a second modulation signal; and
  modulating infrared ray serving as a main carrier wave on the basis of the second modulation signal and outputting second modulated infrared ray to be transmitted said reception device,
    wherein said demodulation step includes the step of generating a data clock on the basis of the reception signal, and outputs the demodulation signal at the timing of the data clock, and
    wherein said step of subjecting a second auxiliary carrier wave to the phase-shift modulation includes the step of generating a transmission channel clock having a frequency which is five-fourth the data clock on the basis of the digital data, and outputs the digital data at the timing of the transmission channel clock.

35. A transfer device comprising a transmitter, a relay and a receiver,
  wherein said transmitter comprises:
    first means for subjecting a first auxiliary carrier wave to a phase-shift modulation on the basis of a digital data, and outputting a first modulation signal;
    first infrared ray emitting means for modulating infrared serving as a main carrier wave on the basis of the first modulation signal and outputting first modulated infrared ray, said means for subjecting a first auxiliary carrier wave to a phase-shift modulation includes first generating means for generating a transmission channel clock having a frequency which is five-fourth the data clock of the digital data on the basis of the digital data, and outputting the modulation signal at the timing of the transmission channel clock,
  wherein said relay comprises:
    first light receiving means for receiving the first modulated infrared ray and outputting a first reception signal corresponding to the first modulation signal on the basis of the first modulated infrared ray;
    first demodulation means for demodulating the first reception signal and outputting digital data;
    second means for subjecting a second auxiliary carrier wave to said phase-shift modulation on the basis of the digital data from said first demodulation means, and outputting a second modulation signal; and second infrared emitting means for modulating infrared ray serving gas a main carrier wave on the basis of the second modulation signal and outputting a second modulated infrared ray to be transmitted to said reception device, said first demodulation means having first data clock generating means for generating data clock, and outputs the digital data at the timing of the data clock while said second means for subjecting said second auxiliary carrier wave to said phase-shift modulation includes second generating means for generating a transmission channel clock having a frequency which is five-fourth the data clock of the digital data on the basis of the digital data, and outputs the modulation signal at the timing of the transmission channel clock, and wherein said receiver comprises:

second light receiving means for receiving the second modulated infrared ray and outputting a second reception signal corresponding to the second modulation signal on the basis of the second modulated infrared ray; and second demodulation means for demodulating the second reception signal and outputting digital data, wherein said second demodulation means has second data clock generating means for generating a data clock on the basis of the second reception signal, and outputs the digital data signal at the timing of the data clock.

36. A data transfer apparatus for transmitting data, comprising:

an input interface circuit for receiving a digital data modulated in a biphase mark system and demodulating the modulated digital data and converting the digital data to an output signal of a predetermined format;

a transmitter coupled to the input interface circuit for subjecting an auxiliary carrier wave to a phase-shift modulation on the basis of the output signal of said conversion means and outputting a modulation signal; and an infrared emitter coupled to the transmitter for modulating an infrared ray serving as a main carrier wave on the basis of the modulation signal and outputting modulated infrared ray;

wherein the transmitter includes a transmission channel generating circuit for generating a transmission channel clock having a frequency which is five-fourth a data clock of the digital data on the basis of the digital data, and outputs the modulation signal at the timing of the transmission channel clock.

37. The apparatus of claim 36 wherein said phase-shift modulation includes a QPSK modulation.

38. The apparatus of claim 36 wherein said modulation signal includes an RF signal.

39. The apparatus of claim 36 wherein said input interface circuit is configured to alter a preamble of said demodulated digital data to a data of 4 bits.

40. The apparatus of claim 36 wherein said predetermined format includes IEC 958 format.

41. The apparatus of claim 36 further including:

an infrared ray detector configured to receive said modulated infrared ray and output a reception signal corresponding to the modulation signal on the basis of the modulated infrared ray;

a receiver coupled to the infrared ray detector configured to demodulate the reception signal and output a demodulation signal; and an output interface circuit coupled to the receiver configured to convert the demodulation signal to a digital data which is modulated in a biphase mark system;

wherein said receiver includes a data clock reproducing circuit configured to generate a data clock on the basis of the reception signal and output the demodulation signal at the timing of the data clock.

42. The apparatus of claim 41 wherein said phase-shift modulation includes a QPSK modulation.

43. The apparatus of claim 41 wherein said modulation signal includes an RF signal.

44. The apparatus of claim 41 wherein said input interface circuit is configured to alter a preamble of said demodulated digital data to a data of 4 bits.

45. The apparatus of claim 41 wherein said predetermined format includes IBC 958 format.

46. A data receiving apparatus for receiving data, comprising:

an infrared ray detector configured to receive a modulated infrared ray which is obtained by modulating an infrared ray serving as a main carrier wave on the basis of a modulation signal, wherein the modulation signal is obtained by subjecting an auxiliary carrier wave to a phase-shift modulation on the basis of a signal of a predetermined format and transmitted at the timing of a transmission channel clock having a frequency which is five-fourth the digital data, said infrared ray detector outputting a reception signal corresponding to the modulation signal on the basis of the modulated infrared ray;

a receiver coupled to the infrared ray detector configured to demodulate the reception signal and output a demodulation signal; and an output interface circuit coupled to the receiver configured to convert the demodulation signal to a digital data which is modulated in a biphase mark system;

wherein said receiver includes a data clock reproducing circuit configured to generate a data clock on the basis of the reception signal and output the demodulation signal at the timing of the data clock.

47. The apparatus of claim 46 wherein said phase-shift modulation includes a QPSK modulation.

48. The apparatus of claim 46 wherein said modulation signal includes an RF signal.

49. The apparatus of claim 46 wherein said predetermined format includes IEC 958 format.

* * * * *